US008352247B2

(12) United States Patent
Cherepanov et al.

(10) Patent No.: US 8,352,247 B2
(45) Date of Patent: Jan. 8, 2013

(54) STATISTICAL STEMMING

(75) Inventors: Evgeny A. Cherepanov, Rybinsk (RU);
Oleksandr Grushetskyy, Cupertino, CA
(US); Dmitry N. Orlov, Balashiha (RU)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/453,473

(22) Filed: Apr. 23, 2012

(65) Prior Publication Data
US 2012/0209592 A1    Aug. 16, 2012

Related U.S. Application Data

(63) Continuation of application No. PCT/RU2009/000601, filed on Nov. 5, 2009.

(51) Int. Cl.
*G06F 17/27* (2006.01)

(52) U.S. Cl. ........... 704/9; 704/1; 704/2; 704/8; 704/10; 707/706; 707/707; 707/708; 715/254; 715/255

(58) Field of Classification Search ............... 704/1–10; 707/706–708; 715/254, 255
See application file for complete search history.

(56) References Cited

U.S. PATENT DOCUMENTS

| | | | | | |
|---|---|---|---|---|---|
| 5,475,587 | A | * | 12/1995 | Anick et al. ................... | 704/9 |
| 5,559,693 | A | * | 9/1996 | Anick et al. ................... | 704/9 |
| 5,627,748 | A | * | 5/1997 | Baker et al. ................... | 715/210 |
| 5,680,628 | A | * | 10/1997 | Carus et al. ................... | 704/1 |
| 5,794,177 | A | * | 8/1998 | Carus et al. ................... | 704/9 |
| 5,873,660 | A | * | 2/1999 | Walsh et al. ................... | 400/63 |
| 6,137,911 | A | * | 10/2000 | Zhilyaev ....................... | 382/225 |
| 6,377,945 | B1 | * | 4/2002 | Risvik .......................... | 1/1 |
| 6,714,906 | B1 | * | 3/2004 | Ji et al. ......................... | 704/10 |
| 7,225,121 | B2 | * | 5/2007 | Maxwell et al. .............. | 704/9 |
| 7,409,334 | B1 | * | 8/2008 | Shoemaker .................... | 704/8 |
| 8,095,549 | B2 | * | 1/2012 | Shankara ...................... | 707/755 |
| 2002/0123995 | A1 | * | 9/2002 | Shibuya ........................ | 707/6 |
| 2007/0106640 | A1 | * | 5/2007 | Shankara ...................... | 707/3 |
| 2009/0125529 | A1 | * | 5/2009 | Vydiswaran et al. ......... | 707/100 |
| 2009/0248707 | A1 | * | 10/2009 | Mehta et al. .................. | 707/100 |
| 2009/0307213 | A1 | * | 12/2009 | Deng et al. .................... | 707/5 |
| 2009/0313248 | A1 | * | 12/2009 | Balachandran et al. ....... | 707/6 |
| 2010/0169311 | A1 | * | 7/2010 | Tengli et al. .................. | 707/736 |
| 2010/0205135 | A1 | * | 8/2010 | Ongole .......................... | 706/48 |
| 2011/0208512 | A1 | * | 8/2011 | Gao ............................... | 704/9 |

OTHER PUBLICATIONS

International Search Report and Written Opinion from related PCT International Application No. PCT/RU2009/000601, mailed Dec. 3, 2010, 12 pages.
International Preliminary Report on Patentability and Written Opinion from related PCT International Application No. PCT/RU2009/000601, mailed May 18, 2012, 10 pages.

* cited by examiner

*Primary Examiner* — David R Hudspeth
*Assistant Examiner* — Lamont Spooner
(74) *Attorney, Agent, or Firm* — Fish & Richardson P.C.

(57) ABSTRACT

Methods, systems, and apparatus, including computer programs encoded on computer storage media, for generating suffix rewriting rules. A method includes obtaining a plurality of canonical suffix-rewriting rules each associated with one or more words, generating a suffix tree from the words, selecting a minimum colored subset of the nodes and leaves in the suffix tree, and generating a plurality of final suffix-rewriting rules from the nodes in the minimum colored subset. Another method includes receiving applicable and non-applicable words for a suffix-rewriting rule, generating a suffix tree from the applicable words and the non-applicable words, selecting a minimum colored subset of the nodes and leaves in the suffix tree, and generating a plurality of suffix-rewriting rules, wherein each rule corresponds to a node in the minimum colored subset with a valid status.

21 Claims, 16 Drawing Sheets

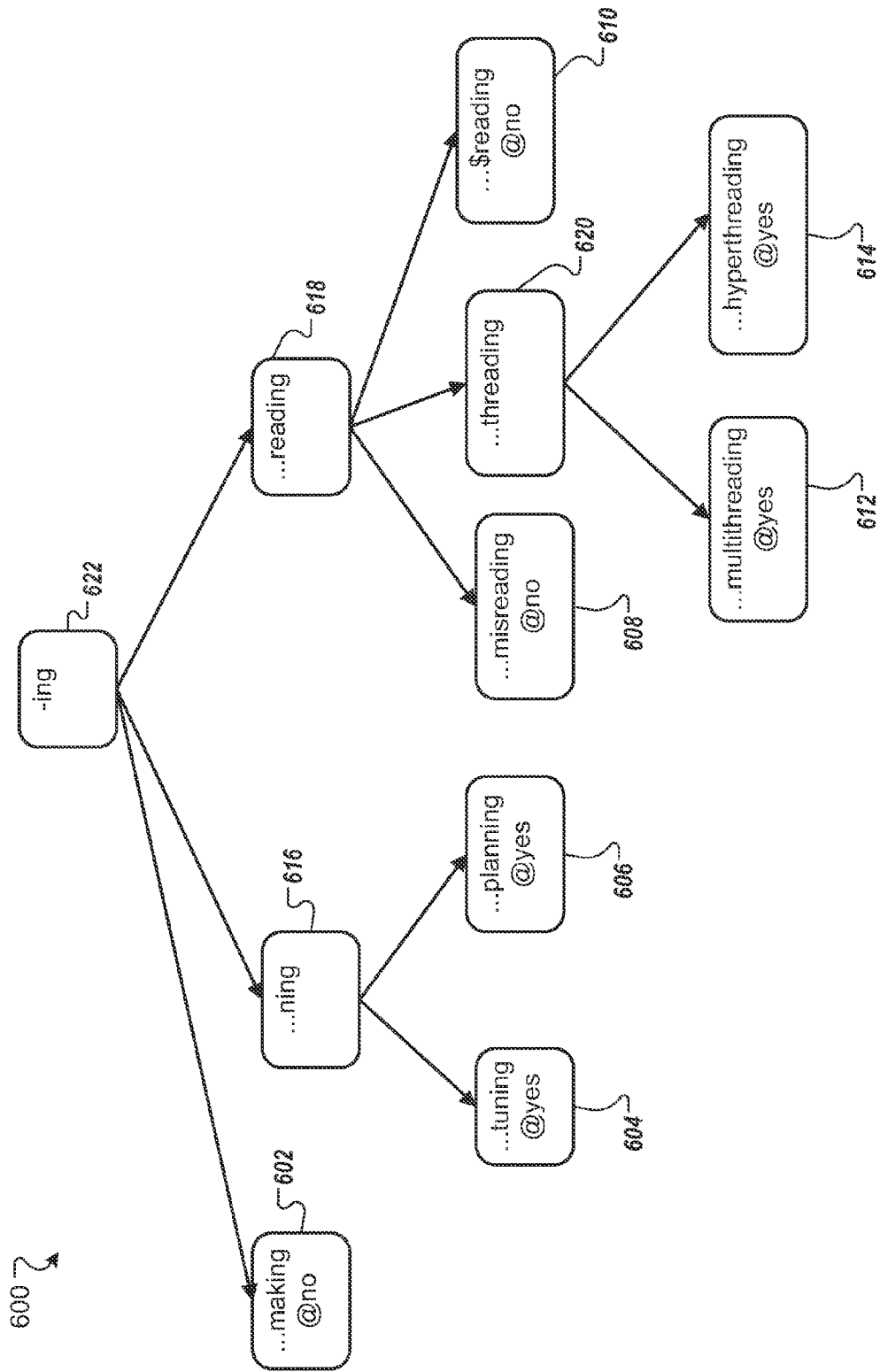

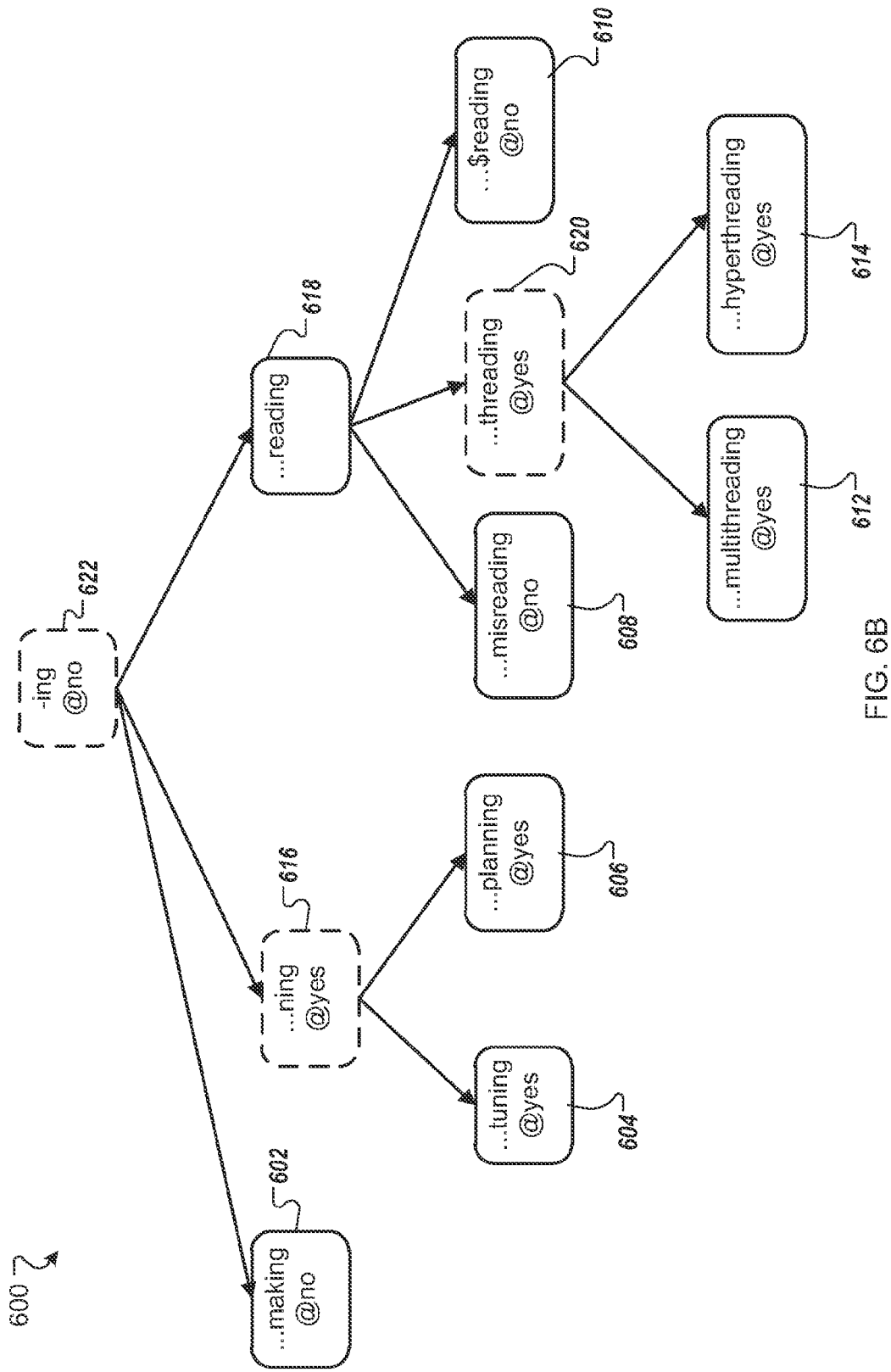

STATISTICAL STEMMING

CROSS-REFERENCE TO PRIOR APPLICATION

This application is a continuation of International Patent Application No. PCT/RU2009/000601, filed Nov. 5, 2009, which is incorporated by reference herein.

BACKGROUND

Internet search engines provide information about Internet accessible resources, e.g., Web pages, images, text documents, and multimedia content, that are responsive to user search queries. Internet search engines return a set of search results in response to a user submitted query. To provide better search results to users, search engines can modify queries to include normalized forms of search terms and variant forms of search terms. These normalized and variant forms are often determined according to dictionaries or observed co-occurrences of word forms in resources and search queries.

SUMMARY

In general, one aspect of the subject matter described in this specification can be embodied in methods that include the actions of obtaining a plurality of canonical suffix-rewriting rules, each rule associated with one or more words to which the rule applies, wherein each canonical suffix-rewriting rule specifies a suffix replacement; generating a suffix tree from the words associated with the canonical suffix-rewriting rules, the suffix tree comprising a plurality of nodes and a plurality of leaves arranged in a hierarchical structure, wherein each node has one or more children below the node in the tree and each child is either a node or a leaf, and wherein each leaf corresponds to a distinct one of the words associated with the canonical suffix-rewriting rules and each node corresponds to a suffix of its children in the tree; selecting a minimum colored subset of the nodes and leaves in the suffix tree, wherein each node and leaf in the minimum colored subset is associated with a respective optimal canonical suffix-rewriting rule, wherein the minimum colored subset and optimal canonical suffix-rewriting rules are selected such that a derived canonical suffix-rewriting rule for each leaf matches the canonical suffix-rewriting rule associated with the word corresponding to the leaf, wherein the derived canonical suffix-rewriting rule for each leaf is the optimal canonical suffix-rewriting rule for a first colored ancestor of the leaf in the tree, and wherein the first colored ancestor for a leaf is the leaf, if the leaf is included in the minimum colored subset, and otherwise is a first node above the leaf in the tree that is in the minimum colored subset; and generating a plurality of final suffix-rewriting rules, each rule mapping a suffix of a node in the minimum colored subset to the suffix of the node with the suffix replacement specified by the canonical rule for the node. Other embodiments of this aspect include corresponding systems, apparatus, and computer programs recorded on computer storage devices, each configured to perform the operations of the methods.

These and other embodiments can each optionally include one or more of the following features. Obtaining the plurality of canonical suffix-rewriting rules can include obtaining a first plurality of word-variant pairs, each pair comprising a word and a variant for the word, and associating a canonical suffix-rewriting rule with each of the word-variant pairs, including removing a longest common prefix from the word and the variant, and then generating the canonical suffix-rewriting rule from a remaining suffix of the word and a remaining suffix of the variant. The variant for each word can be a normalized form of the word. Obtaining the first plurality of word-variant pairs can include obtaining a second plurality of word-variant pairs, each second pair comprising a word and a variant for the word, each second pair associated with a confidence measure, clustering the words in the second plurality of word-variant pairs according to relationships between words and variants in the word-variant pairs, determining an optimal normalized form for each word in the second plurality of word pairs, the determining including selecting an optimal normalized form for each cluster, and generating the first plurality of word-variant pairs, each pair associating a word from one of the second word-variant pairs with the optimal normalized form for the cluster for the word.

Selecting the minimum colored subset of the nodes and leaves in the suffix tree can include determining optimal conditional rules for each node and leaf in the suffix tree, and then selecting the minimum colored subset and the optimal canonical suffix-rewriting rule for each node and leaf in the subset according to the optimal conditional rules. The optimal conditional rule for a node or leaf can be the rule that is optimal for the condition that a parent node of the node or leaf is associated with a particular canonical suffix-rewriting rule. Selecting an optimal canonical suffix-rewriting rule for each node according to the optimal conditional rules for the node can include determining an optimal canonical suffix-rewriting rule for a root of the suffix tree, and determining an optimal canonical suffix-rewriting rule for each remaining node in the tree, wherein the optimal canonical suffix-rewriting rule for a node in the tree is the optimal conditional rule for the canonical suffix-rewriting rule associated with a parent of the node.

The method can further include generating a normalized form of a word using one of the plurality of final suffix rewriting rules. The method can further include generating a variant for a word using one of the plurality of final suffix rewriting rules.

In general, another aspect of the subject matter described in this specification can be embodied in methods that include the actions of receiving, for a canonical suffix-rewriting rule, a plurality of applicable words and a plurality of non-applicable words, wherein each applicable word is a word to which the rule should be applied, and each non-applicable word is a word to which the rule should not be applied, and wherein the canonical suffix-rewriting rule specifies a suffix replacement; generating a suffix tree from the applicable words and the non-applicable words, the suffix tree comprising a plurality of nodes and a plurality of leaves arranged in a hierarchical structure wherein each node has one or more nodes or one or more leaves below the node in the tree, wherein each leaf corresponds to either a unique applicable word or a unique non-applicable word, and each node corresponds to a suffix of its children in the tree; selecting a minimum colored subset of the nodes and leaves in the suffix tree, wherein each node and leaf in the minimum colored subset has an associated optimal status, wherein the minimum colored subset and the optimal status of each node and leaf in the minimum colored subset are selected such that a derived status for each leaf is valid when the leaf corresponds to an applicable word, and the derived status for each leaf is not valid when the leaf corresponds to a non-applicable word, wherein the derived status for each leaf is the optimal status for the leaf if the leaf is included in the minimum colored subset, and otherwise is the optimal status of a first node above the leaf in the tree that is in the minimum colored subset; and generating a plurality of suffix-rewriting rules, wherein each rule corresponds to a node in the minimum colored subset with a valid status, and maps the suffix of the node to the suffix of the node with the replacement specified by the suffix-rewriting rule. Other embodiments of this aspect include corresponding systems, apparatus, and computer programs recorded on computer storage devices, each configured to perform the operations of the methods.

These and other embodiments can each optionally include one or more of the following features. The optimal status for each node or leaf in the minimum colored subset can be valid or invalid. Selecting the minimum colored subset of the nodes and leaves and the optimal status for each node and leaf in the minimum colored subset can include determining optimal conditional statuses for each node and leaf in the suffix tree, and then determining whether to include each node and leaf in the minimum colored subset and determining the optimal status for each node and leaf in the minimum colored subset according to the optimal conditional statuses. The optimal conditional statuses can include a optimal conditional status for the node for the condition where a parent node of the node has a valid status and an optimal conditional status for the condition where a parent node of the node has an invalid status. Determining whether to include each node and leaf in the minimum colored subset and determining the optimal status for each node and leaf in the minimum colored subset according to the optimal conditional statuses can include determining whether the root of the suffix tree has an invalid or valid status from the optimal conditional status for the root, and determining, for each remaining node and leaf in the tree, whether the node or leaf has a valid status, invalid status, or uncolored status according to the optimal conditional status for the node or leaf that corresponds to whether a parent node is valid or invalid. Nodes and leaves having valid or invalid status are in the minimum colored subset.

The method can further include receiving a plurality of uncolored words that are neither applicable nor non-applicable words for the rule. Each leaf corresponds to an applicable word, a non-applicable word, or an uncolored word. The minimum colored subset and the optimal status of each node and leaf in the minimum colored subset are selected such that a derived status for each leaf corresponding to an uncolored word is either valid or invalid.

Receiving the plurality of applicable words and the plurality of non-applicable words for the canonical suffix-rewriting rule can include obtaining a plurality of applicable pairs and a plurality of non-applicable pairs, wherein each applicable pair includes a word and a valid variant of the word, and each non-applicable pair includes a word and a non-valid variant of the word, identifying one or more applicable pairs for the canonical suffix-rewriting rule and one or more non-applicable pairs for the suffix-rewriting rule, wherein identifying a pair for the canonical suffix-rewriting rule comprises matching the suffix replacement of the canonical suffix-rewriting rule to the word and the variant of the pair, and associating the word in each applicable pair for the canonical suffix-rewriting rule with the rule as an applicable word, and associating the word in each non-applicable pair for the canonical suffix-rewriting rule with the rule as a non-applicable word.

Generating a suffix-rewriting rule for a node in the minimum colored subset with a valid status can include determining a confidence measure for the rule, wherein the confidence measure is derived from confidence measures of valid leaves below the node in the suffix tree. The suffix-rewriting rules can include a rule that correspond to a node with an invalid status and maps the suffix of the invalid node to the suffix of the invalid node with the replacement specified by the suffix-rewriting rule. Each rule that corresponds to a node with an invalid status can have a confidence measure below a threshold.

Particular embodiments of the subject matter described in this specification can be implemented so as to realize one or more of the following advantages. A small set of observed suffix-replacements can be used to generate a larger number of suffix-replacement rules. These rules can be more finely grained and therefore more accurate. The suffix replacement rules can each be associated with a confidence measure indicating a confidence in the rule. The suffix-replacement rules can be applied in real-time to create normalized forms of words, and word variants, as needed. Word variants and normalized forms can be created for words, regardless of whether any word variant or normalization data is available for those words. Word variants and normalized forms can be created for rare words, e.g., words that are rarely used.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6A illustrates an example suffix-tree for a particular canonical suffix-rewriting rule.

FIG. 6B illustrates the example suffix tree once a minimum colored subset of the nodes and leaves has been selected, and optimal statuses (e.g., valid or invalid) have been assigned to the nodes and leaves in the minimum colored subset.

Like reference numbers and designations in the various drawings indicate like elements.

DETAILED DESCRIPTION

Figure 1A:
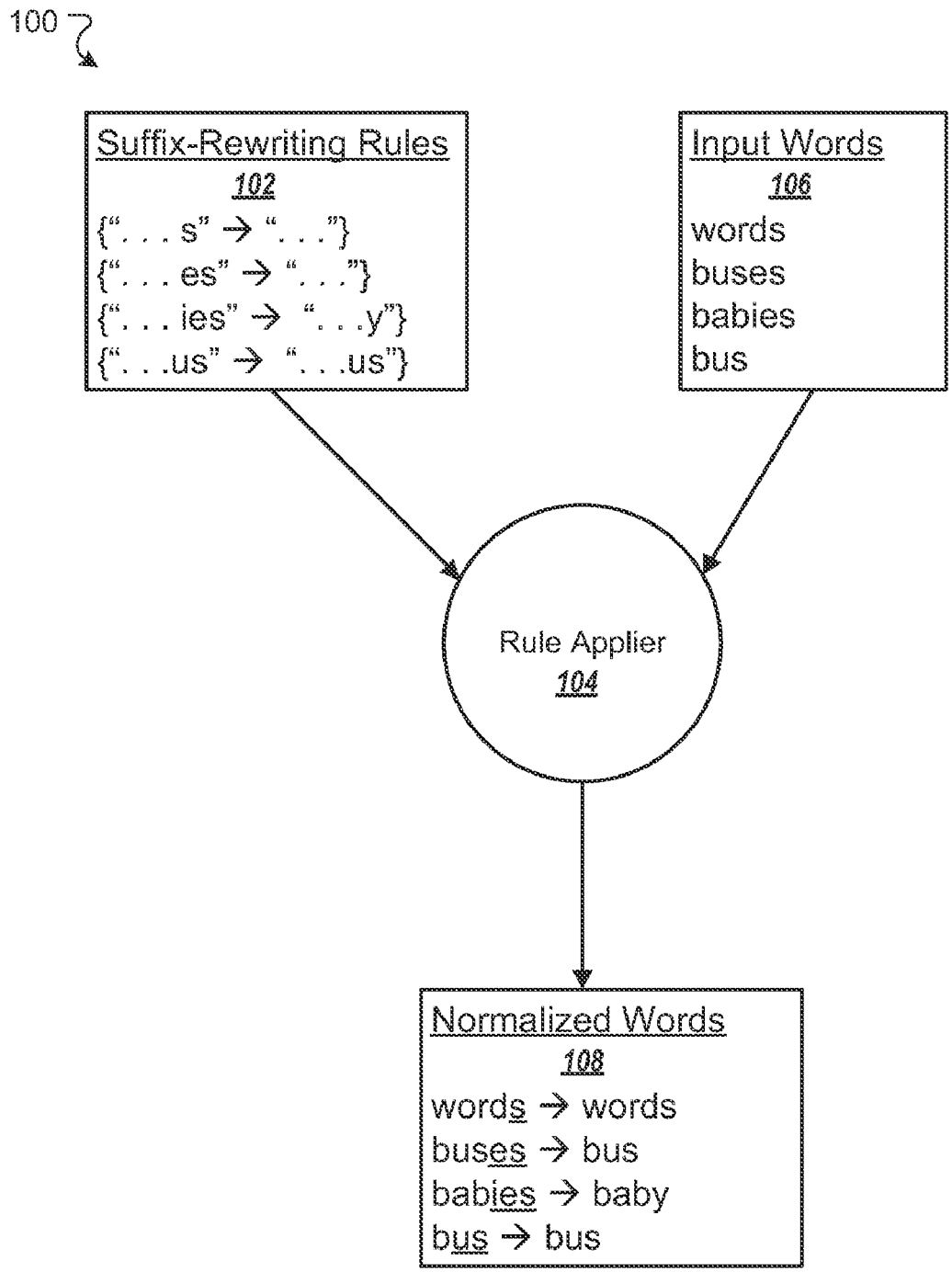
FIGS. 1A and 1B illustrate applying example suffix-rewriting rules.
Figure 1B:
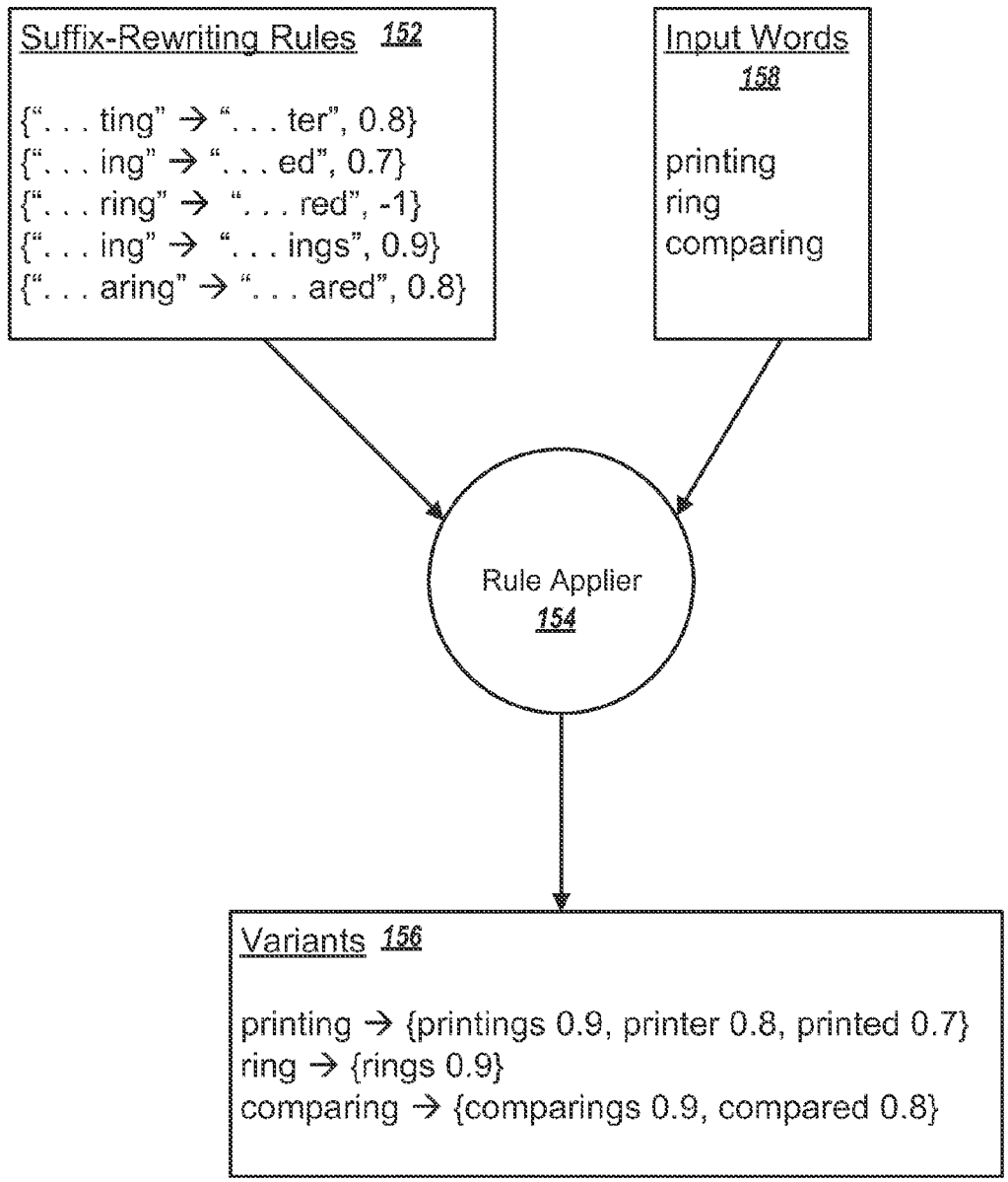

FIGS. 1A and 1B illustrate applying example suffix-rewriting rules. Suffix-rewriting rules are rules that specify how the suffix of a word can be re-written to generate a normalized form of the word, or a word variant of the word. Each suffix-rewriting rule specifies a suffix-replacement, e.g., an initial suffix that is mapped to a replacement suffix.

FIG. 1A illustrates applying suffix-rewriting rules 102 that result in a normalized from of a word. A normalized form of a word is a stem or other base form of the word. For example, a normalized form of "reading" is "read." Each suffix-rewriting rule corresponds to a suffix replacement that maps an initial suffix to a replacement suffix. For example, the suffix-rewriting rules include the rule {"...s"→"..."}. This rule maps the initial suffix "...s" to the replacement suffix "...," and thus indicates that a word ending in "s" is normalized by removing the "s."

A rule applier 104 normalizes input words 106, for example, by applying the longest-matching suffix-rewriting rule to each of the words. This results in a normalized form of each of the words 108.

A word matches a suffix-rewriting rule when the initial suffix of the suffix replacement matches the suffix of the word. For example, the word "words" ends in "s" and therefore matches the suffix-rewriting rule {"...s"→"..."}. Therefore the normalized form of "words" is "word." The word "babies" matches three suffix-rewriting rules: {"...s"→"..."}, {"...es"→"..."}, and {"...ies"→"y"}. The longest rule is {"...ies"→"...y"}, because the initial suffix "ies" is longer than the initial suffixes "es" and "s." Therefore, the normalized form of "babies" is "baby."

In some implementations, the rule applier 104 normalizes the input words 106 in real time, e.g., as they are received or as normalized forms are needed.

FIG. 1B illustrates applying suffix-rewriting rules 152 that result in the generation of word variants. A variant of a word is a different form of the word. The word variant may, but need not be, a normalized form of the word. For example, the word "begs" has variants "beg" and "begging," among other variants. Here, each of the suffix rewriting rules is associated with a confidence measure that estimates a quality of the suffix-rewriting rule. For example, the suffix-rewriting rules include the rule {"...ting"→"ter", 0.8} which indicates that a variant of a word ending in "ting" is the same word ending in "ter," with a confidence measure of 0.8.

A rule applier 154 generates word variants 156 of input words 158. For example, the rule applier 154 applies the suffix rewriting rules 152 for the input word "printing" to generate the variants "printings," "printer," and "printed." To generate these variants, the rule applier matches the word "printing" to three of the suffix-rewriting rules 152: {"...ting"→"...ter," 0.8}, {"...ing"→"ed," 0.7}, and {"...ing"→"...ings," 0.9}. The rule applier 154 then replaces the initial suffix specified by each rule with the replacement suffix specified by each rule to generate the variants.

In some implementations, the rule applier 154 only applies a subset of the rules. The subset is determined according to the confidence measures for each rule. For example, in some implementations, the rule applier 154 applies only rules whose confidence exceeds a threshold, or only a top number of rules having the highest confidence measures. For example, in FIG. 1B, the rule applier 154 did not apply the {"...ring"→"...red,"-1} rule to the word "ring," because the confidence score was too low.

In some implementations, when multiple rules would result in the same variant form, the rule applier 154 only applies the rule with the longest suffix. For example, both the {"...ring"→"...red", -1} rule and the {"...ing"→"...ed," 0.7} rule would result in the variant "red" being generated for the word "ring." {"...ring"→"...red",-1} has a negative confidence value, while {"...ing"→"...ed," 0.7} has a fairly high confidence value. The rule applier 154 determines that "ring" is a longer suffix than "ing" and therefore only tries to apply the {"...ring"→"...red,"-1} rule. Since that rule has a low confidence measure, the rule is not applied, and the variant "red" is not generated for the word "ring."

Figure 2A:
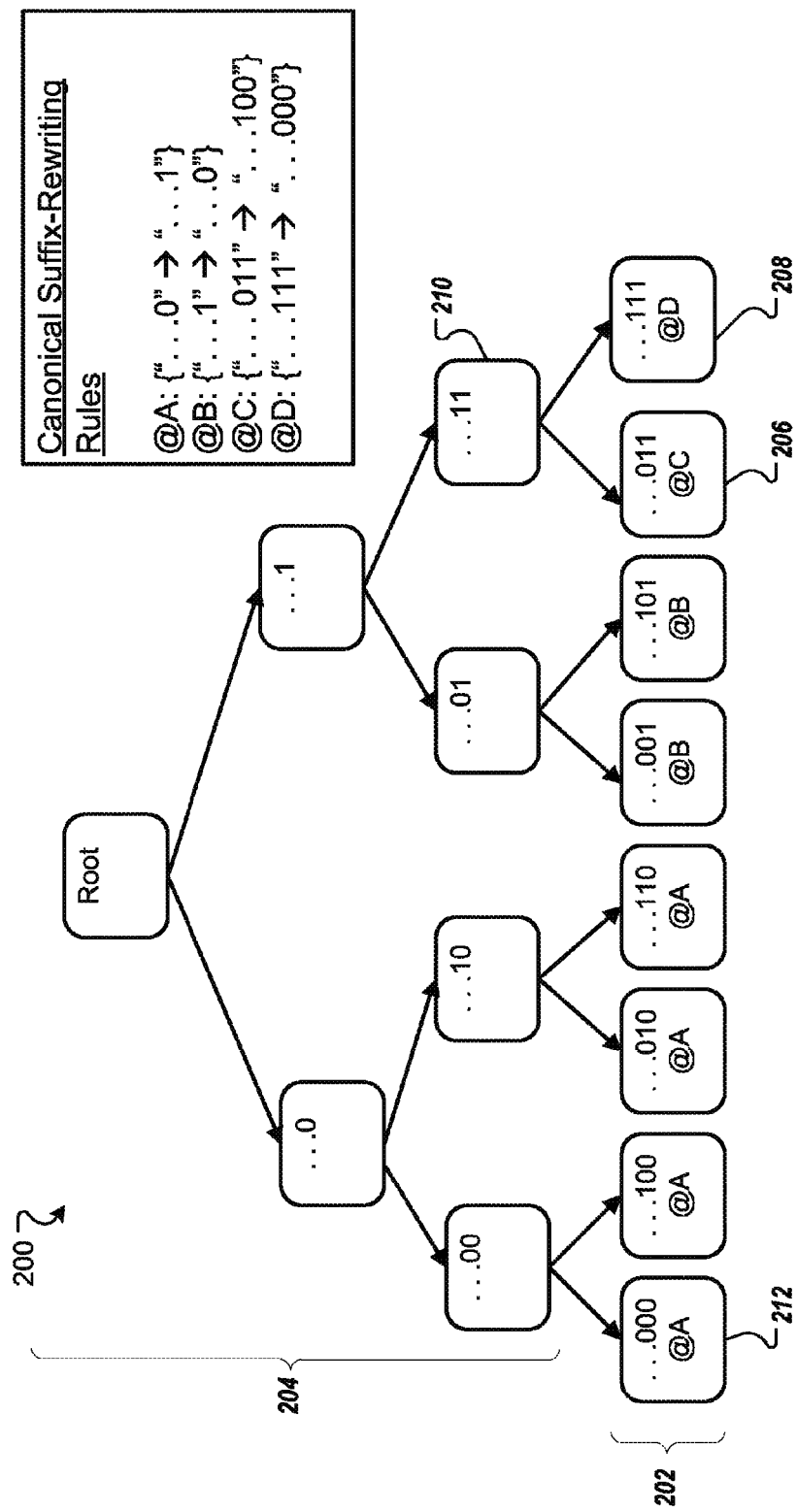
FIG. 2A illustrates an example suffix tree.

FIG. 2A illustrates an example suffix tree 200. A suffix tree is built from one or more words. For illustrative purposes, the suffix tree 200 corresponds to binary words, i.e., words composed of 1s and 0s. However, similar suffix trees can also be formed for words in other alphabets, e.g., English words, Russian words, etc. Each word is a word that has a known suffix replacement, that is, observed data indicates that the word can be normalized or a variant of the word can be created by creating a suffix replacement. The suffix replacement for each word is a canonical suffix-rewriting rule.

The leaves of the tree 202 correspond to the words, and the nodes 204 of the tree correspond to suffixes of the nodes and leaves below them in the tree. For example, leaf 206 corresponds to a word ending in "...011", and leaf 208 corresponds to a word ending in "...111." The node 210 directly above leaves 206 and 208 in the tree corresponds to the common suffix of the nodes "...11."

Each leaf is associated with the canonical suffix-rewriting rule (@A, @B, @C, or @D) corresponding to its word. For example, the word "...000" is associated with the canonical suffix rewriting rule @A: {"...0"→"...1"}; therefore leaf 212 is associated with rule @A.

Figure 2B:
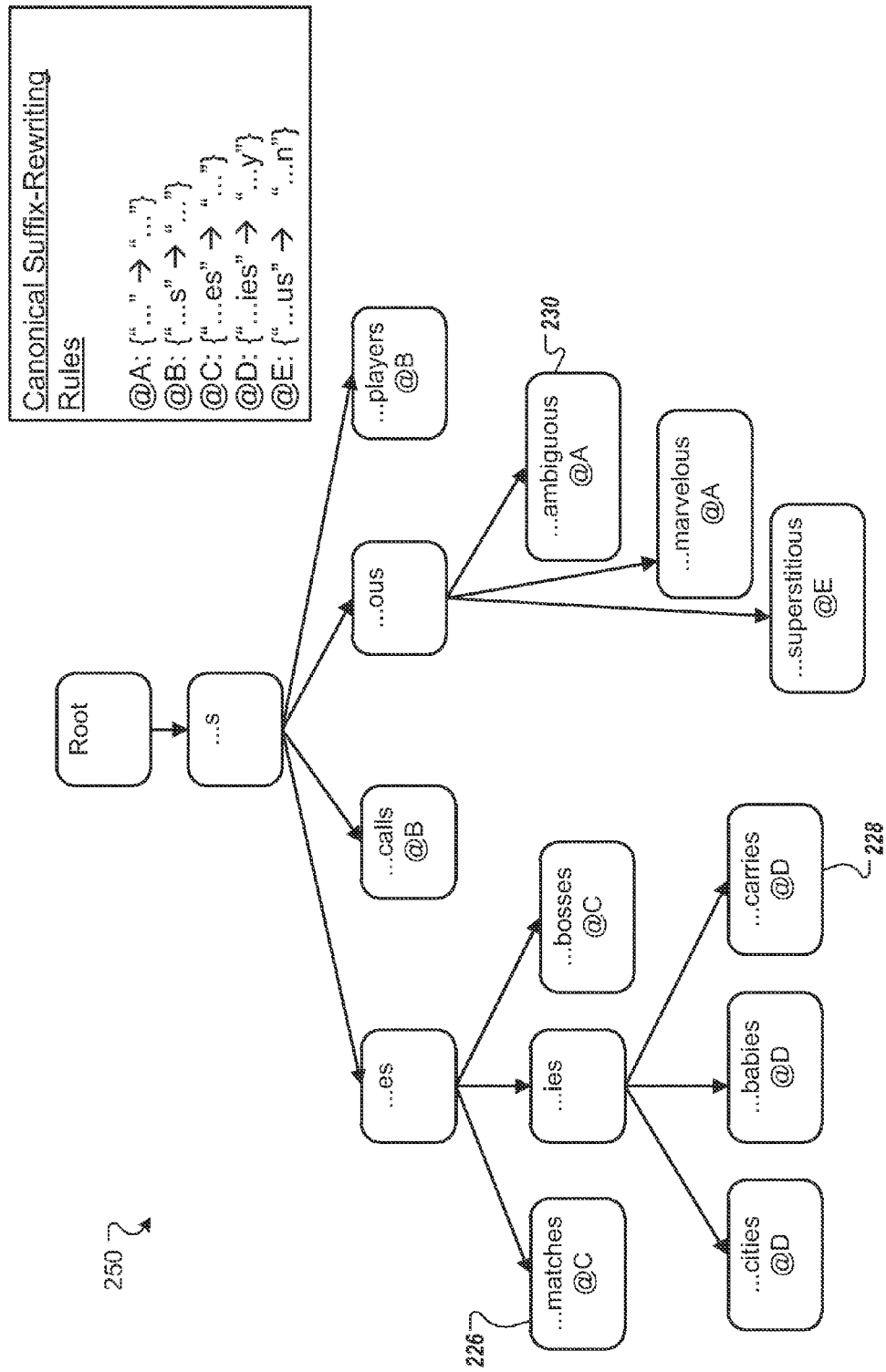
FIG. 2B illustrates another example suffix tree.

FIG. 2B illustrates another example suffix tree 250, corresponding to English words. Each leaf of the suffix tree is associated with a canonical suffix-rewriting rule. For illustrative purposes, the canonical suffix-rewriting rules correspond to normalized forms of the words. For example, the leaf 226 corresponding to the word "matches" is associated with rule @C: {"...es"→"..."}. This means that the normalized form of "matches" is "match." Similarly, leaf 228 corresponding to the word "carries" is associated with rule @D: {"...ies"→"...y"}, meaning the normalized form of "carries" is "carry." As yet another example, leaf 230 corresponding to the word "ambiguous" is associated with the rule @A: {"..."→"..."}, meaning the normalized form of "ambiguous" is "ambiguous."

Figure 2C:
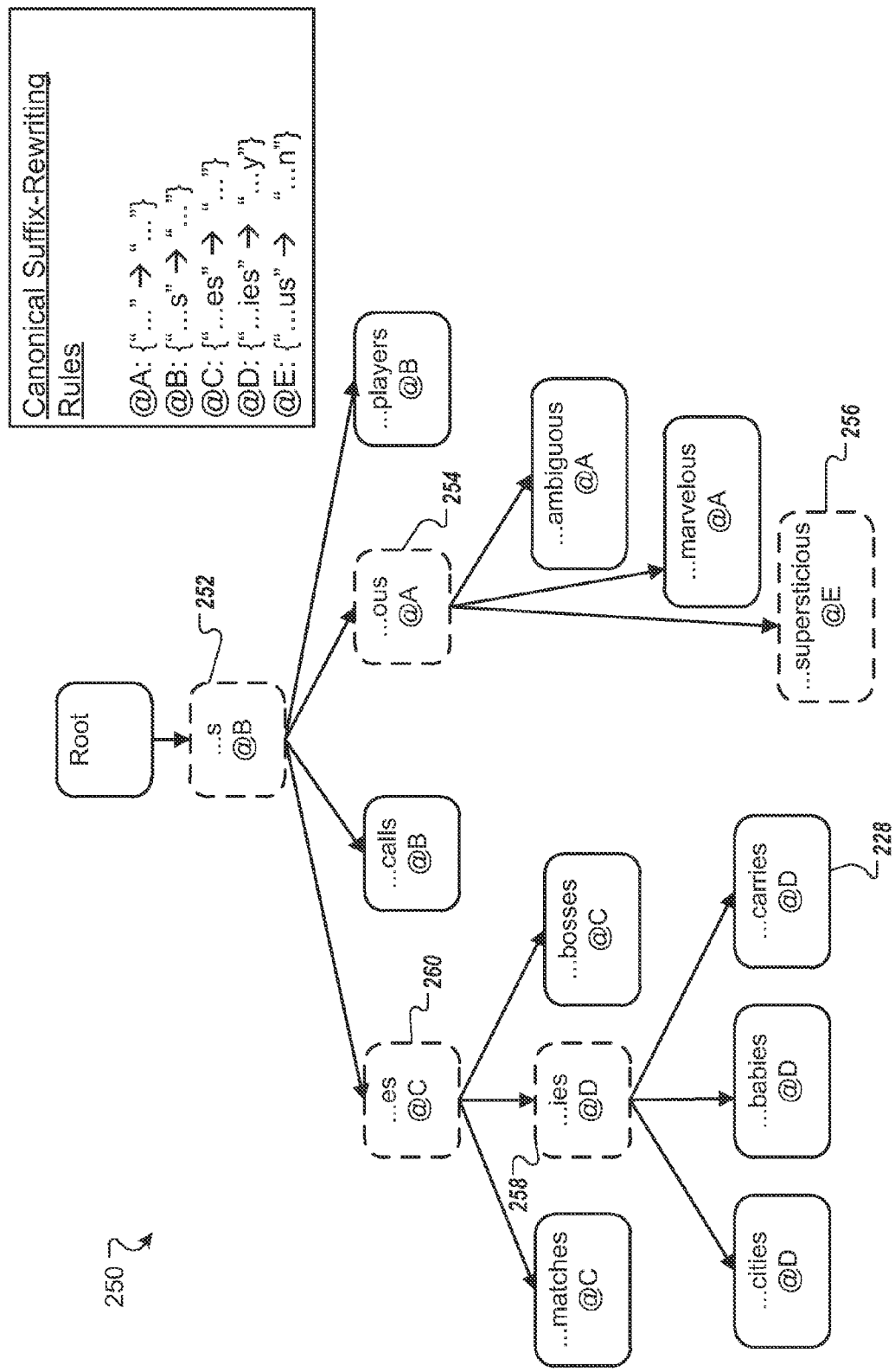
FIG. 2C illustrates the example suffix tree once a minimum colored subset of the nodes and leaves has been selected, and optimal canonical suffix-rewriting rules have been assigned to the nodes and leaves in the minimum colored subset

FIG. 2C illustrates the example suffix tree 250 once a minimum colored subset of the nodes and leaves has been selected, and optimal canonical suffix-rewriting rules have been assigned to the nodes and leaves in the minimum colored subset. The minimum colored subset and optimal canonical suffix-rewriting rules are selected such that a derived canonical suffix-rewriting rule for each leaf matches the canonical suffix-rewriting rule associated with the word corresponding to the leaf. The derived canonical suffix-rewriting rule for each leaf is the optimal canonical suffix-rewriting rule for a first colored ancestor of the leaf in the tree. The first colored ancestor for a leaf is the leaf, if the leaf is included in the minimum colored subset, and otherwise is the first node above the leaf in the tree that is in the minimum colored subset. The minimum colored subset is the smallest subset of nodes and leaves that lead to the correct derived rules for the leaves of the suffix tree.

Nodes and leaves in the minimum subset are indicated by dashed lines. For example, in FIG. 2C, the nodes and leaves in the minimum subset include node 252 corresponding to the suffix "...s" and associated with rule @B, node 254 corresponding to the suffix "...ous" and assigned rule @A, leaf 256 corresponding to the word "...superstitious" and associated with rule @E, node 258 corresponding to the suffix "...ies" and associated with the rule @D, and node 260 corresponding to the suffix "...es" and associated with the rule @C.

From this minimum subset, the correct color of each leaf can be derived from its first color ancestor in the tree. For example, the first color ancestor of leaf 228 (corresponding to the word "carries") is node 258 (corresponding to the suffix " . . . ies"). Node 228 is associated with the optimal rule @D, and therefore, the derived rule for leaf 228 should also be rule @D.

This matches the canonical suffix-rewriting rule associated with leaf 228. As another example, the first color ancestor of leaf 256 (corresponding to the word "superstitious") is the leaf itself. The leaf is associated with the optimal rule @A, which matches the canonical suffix-rewriting rule associated with the leaf 256.

Selecting the minimum subset of nodes and leaves, and assigning optimal rules to the nodes and leaves in the minimum subset is described in more detail below with reference to FIG. 3 and FIGS. 5A-5B.

Once the minimum subset has been identified, additional suffix-rewriting rules can be generated from the nodes in the minimum subset. Each additional suffix-rewriting rule corresponds to one of the nodes. An additional suffix-rewriting rule is generated from a node by generating a suffix-rewriting rule that maps the suffix of the node to the suffix of the node with the suffix-replacement specified by the canonical suffix-rewriting rule for the node. For example, node 254 corresponds to the suffix " . . . ous" and is associated with canonical suffix-rewriting rule @A: {" . . . "→" . . . "}. Therefore, an additional suffix-rewriting rule is generated from node 254 that specifies {" . . . ous"→" . . . ous"}.

In some implementations, a confidence measure is assigned to each of the additional suffix-rewriting rules. The confidence measure can be derived from the number of leaves of the tree that are below the node from which the additional rule was derived, and are associated with the same canonical suffix-rewriting rule, or from the confidence measure of those leaves (e.g., the average confidence measure).

Figure 3:
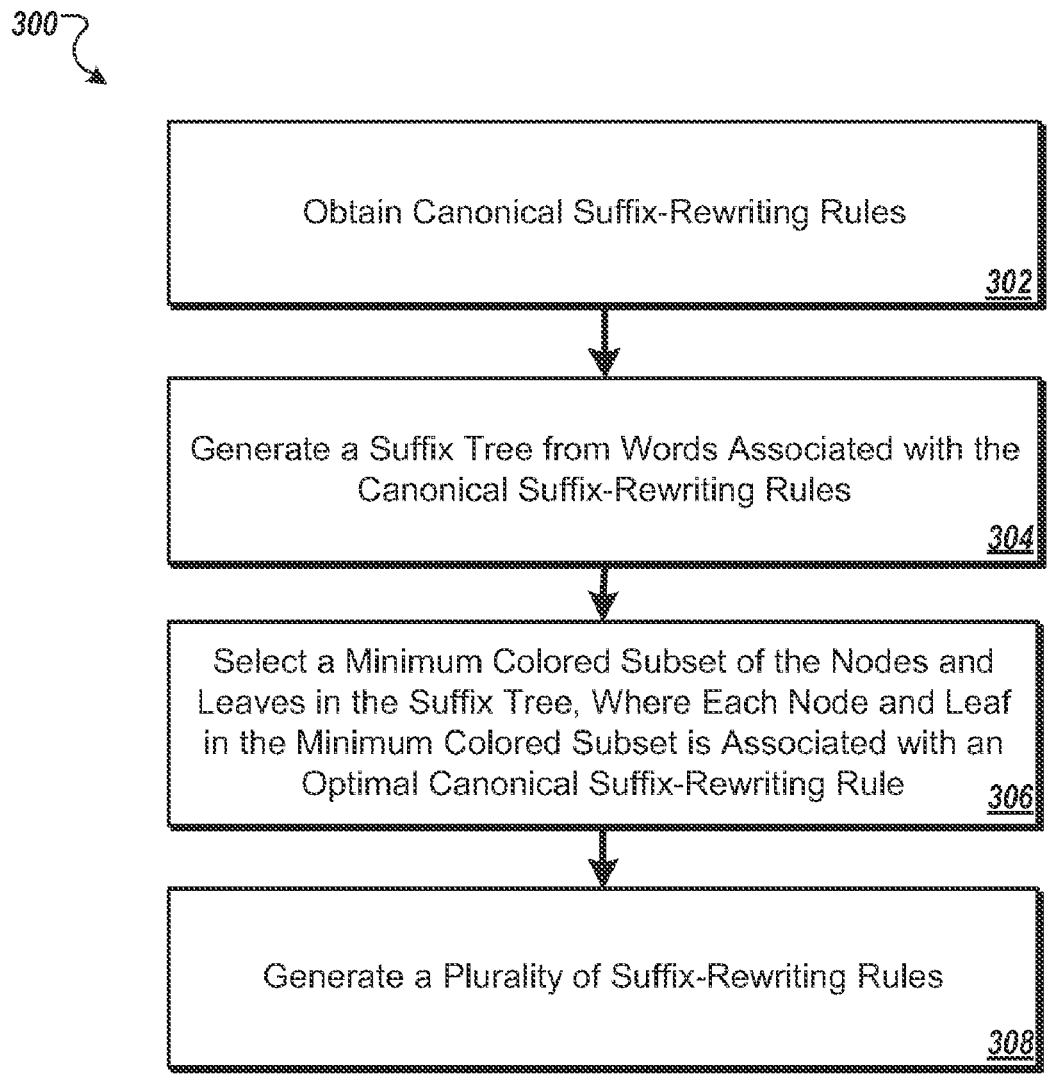
FIG. 3 illustrates an example method for generating suffix-rewriting rules from a suffix tree.

FIG. 3 illustrates an example method 300 for generating suffix-rewriting rules from a suffix tree. For convenience, the method will be described in reference to a system that performs the method. The system can be, for example, one or more computers.

The system obtains canonical suffix-rewriting rules (302). Each canonical suffix-rewriting rule specifies a suffix replacement, for example, as described above with reference to FIG. 1A. The canonical suffix-rewriting rules are rules for creating word variants or rules for creating normalized forms of words. Each rule is also associated with one or more words to which the rule applies. In some implementations, the system generates the canonical suffix-rewriting rules itself; in other implementations, the system receives the rules from another system. Example techniques for generating the canonical suffix-rewriting rules are described below with reference to FIGS. 4A and 4B.

The system generates a suffix tree from words associated with the canonical suffix-rewriting rules (304). The suffix tree has both nodes and leaves. The nodes and leaves are arranged in a hierarchical structure wherein each node has one or more children below the node in the tree, and each child is either another node or a leaf. Each leaf corresponds to one of the words associated with the canonical suffix-rewriting rules, and each node corresponds to a suffix of its children nodes. An example suffix tree is described above with reference to FIG. 2A.

The system builds the suffix tree, for example, by generating leaves corresponding to the words associated with the canonical suffix-rewriting rules. The system then generates the nodes of the tree, starting from the leaves of the tree and building to the root of the tree. The suffix for each node is a common suffix shared by all of the node's children leaves and nodes. The system selects a minimum colored subset of the nodes and leaves in the suffix tree (306). Each node and leaf in the minimum colored subset is associated with a optimal canonical suffix-rewriting rule. The minimum subset is selected such that a derived canonical suffix-rewriting rule for each leaf matches the canonical suffix-rewriting rule associated with the word corresponding to the leaf, for example, as described above with reference to FIG. 2C. An example technique for determining the optimal canonical suffix rewriting rule for a node is described in more detail below, with reference to FIGS. 5A and 5B.

Once one or more nodes are associated with an optimal canonical suffix-rewriting rule, the system generates a plurality of suffix-rewriting rules (308), for example, as described above with reference to FIG. 2C. Each rule maps a suffix of a node in the suffix tree to the suffix of the node with the replacement suffix specified by the canonical rule for the node.

Figure 4A:
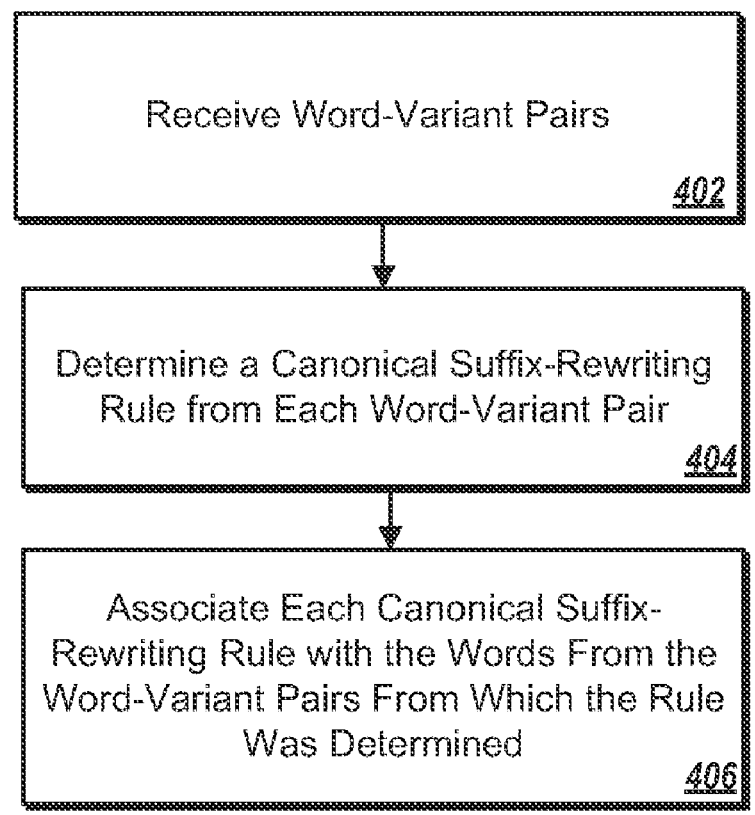
FIG. 4A illustrates an example method for generating canonical suffix-rewriting rules.

FIG. 4A illustrates an example method 400 for generating canonical suffix-rewriting rules. For convenience, the method will be described in reference to a system that performs the method.

The system receives word-variant pairs (402). Each word-variant pair associates a word with a variant of the word. The variant is a normalized form of the word or a variant of the word. For example, a word-variant pair could associate "biking" with its normalized form "bike," or could associate "biking" with a variant "biked." In some implementations, the word-variant pairs are received, for example, from a computer database associating words with variants. In some implementations, the word-variant pairs are generated from data on how users use the words, for example, from an analysis of the co-occurrence of words in documents or an analysis of the occurrence of words in queries submitted by users.

The system determines a rule for each word-variant pair (404). The system determines the rule by removing the longest common-prefix from the word and the variant, and then mapping the remaining suffix of the word to the remaining suffix of the variant. For example, if the word-variant pair is {"bike," "biking"}, the system would identify the longest common prefix of "bike" and "biking," i.e., "bik." The system would then map the remaining suffix of the word to the remaining suffix of the variant, i.e., {" . . . e"→" . . . ing"}.

In some implementations, the system also determines a confidence measure for each rule from the confidence measure(s) of the word-variant pairs used to generate the rule. When a rule is generated from a single word-variant pair, the rule is assigned a confidence measure equal to the confidence measure of the word-variant pair. When a rule is generated from multiple word-variant pairs, the rule is assigned a confidence measure equal to a combination of the confidence measures for the multiple word variant pairs, e.g., an average of the confidence measures for the multiple word variant pairs.

The system associates each of the rules with the words from the word-variant pairs from which the rule was determined (406). For example, if the rule {" . . . e"→" . . . ing"} was derived from both the word-variant pair {"bike", "biking"} and the word-variant pair {"hike," "hiking"}, the system associates the rule {" . . . e"→" . . . ing"} with the words "bike" and "hike."

Figure 4B:
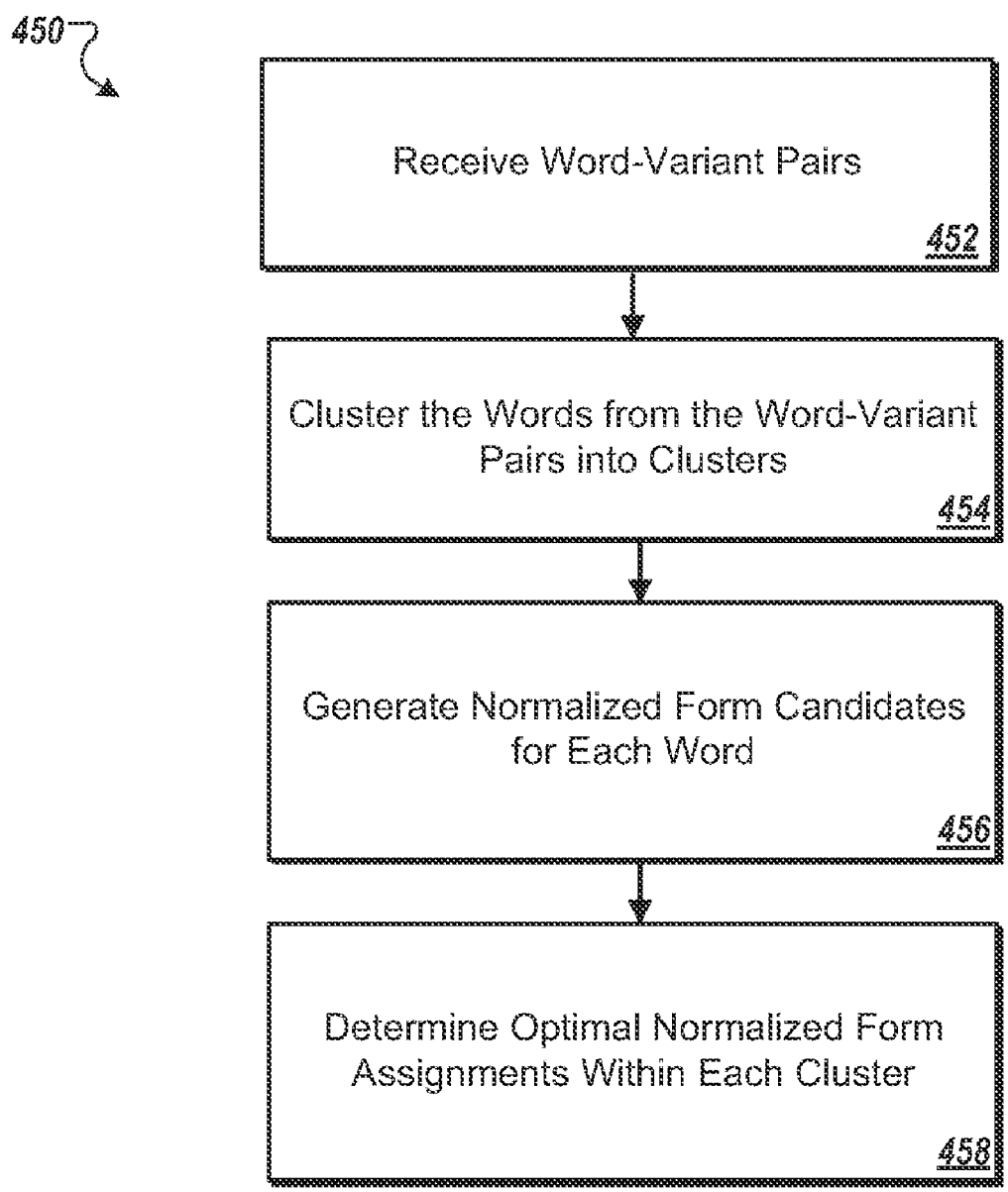
FIG. 4B illustrates an example method for determining the normalized form of words.

FIG. 4B illustrates an example method 450 for determining the normalized form of words. The normalized forms are then used in word-variant pairs, where the variant is the normalized form of the word, and canonical suffix-rewriting rules are derived from these pairs using the technique described above with reference to FIG. 4A. For convenience, the method will be described in reference to a system that performs the method.

The system receives word-variant pairs (452), for example, as described above with reference to FIG. 4A. Each word-variant pair associates a word with a word variant, and optionally with a confidence measure, e.g., {"biking," "biked," 0.9}.

The system clusters the words from the word-variant pairs into clusters (454). In some implementations, the system does the clustering by generating a graph G, where the nodes of the graph are the words of the word-variant pairs, and the edges of the graph are directed edges from each word to its variant in the graph. Each edge of the graph is weighted by the confidence measure of the word-variant pair corresponding to the edge. The system then generates the clusters by clustering the words corresponding to the transitive closure of the edges in the graph having a weight that exceeds a threshold. In general, the threshold is chosen so that most confidence measures for valid word-variant pairs are above the threshold and most confidence measures for invalid word-variant pairs are below the threshold. The threshold can be, for example, 0.

The system generates normalized form candidates for each word from the word-variant pairs (456). The system can generate the normalized form candidates for a given word W in various ways. In some implementations, the system generates all substrings of the word W as well as all substrings of the words $W_i$ that are adjacent to the word W in the graph. Alternatively, the system generates a subset of the substrings of the word W and the words Wi. The system then calculates a score for the substrings according to the below formula, and then selects a predetermined number of highest-scoring substrings $N_i$ as candidate normalized forms. For example, in some implementations the system calculates the score for a given substring N according to the following formula:

$$Score_0(W, N) = \frac{\sum_{W_i}(edge(W, W_i) \times \rho(W_i, N))}{\sum_{W_i} edge(W, W_i)},$$

where each $W_i$ is a node adjacent to W in the graph G, edge $(W, W_i)$ is the weight of the edge between W and $W_i$ in the graph G (i.e., the confidence measure for the word-variant pair corresponding to W and $W_i$), and $\rho$ is an edit distance function. For example, in some implementations, $\rho$ is determined according to the function:

$$\rho(W,N) = e^{-\alpha(|W|-L) - \beta(|N|-L)},$$

wherein |W| is the number of characters in the word W, |N| is the number of characters in the substring N, L is the number of characters in the longest common prefix of W and N, and $\alpha$ and $\beta$ are constants. $\alpha$ and $\beta$ can be determined, for example, empirically.

Alternatively, instead of using $Score_0$ to score the candidates, the system can use an iteratively generated form of the score. The iteratively generated form can be determined, for example, using the $Score_{k+1}$ formula described below.

In some implementations, the system alternatively or additionally identifies candidate normalized forms N for a given word W by determining canonical suffix-rewriting rules for the word-variant pairs, for example, as described above with reference to FIG. 4A. The system then applies the canonical suffix-rewriting rules for words with the same suffix as the word W to the word W to generate additional candidate normalized forms N.

In some implementations, once the system has determined a number of candidate normalized forms N for each word W, the system augments the candidate normalized forms N for a given word W with the candidate normalized forms for words W that are adjacent to W in the graph. In some implementations, the system selects a subset of the candidate normalized forms for the words W that are adjacent to W in the graph. For example, the system can generate a matching score (e.g., according to the $Score_{k+1}$ formula described below, calculated after a given number of iterations) for each adjacent candidate form, and then select a number of top-scoring candidates. The system can select all candidates whose score exceeds a threshold, or can select a pre-determined number of top-scoring candidates. The threshold and/or number can be determined, for example, empirically. In some implementations, the subset is all candidates from the nodes immediately adjacent to W in the graph.

The system determines the optimal normalized form assignments within each cluster (458). For example, in some implementations, the system assigns normalized forms to words within each cluster by maximizing the following function. The system maximizes this function using various conventional optimization algorithms.

$$F(N) = \Sigma FinalScore(W_i, N_i) - A \times (\Sigma edge(W_i, W_j) | N_i \neq N_j) - B \times (\Sigma noEdge(W_i, W_j) | N_i = N_j)$$

where A and B are constants determined, for example, empirically, each $W_i$ is a word in the cluster, and each $N_i$ is a candidate normalized from for the word $W_i$.

For example, for small clusters (e.g., less than ten nodes), the system can apply conventional dynamic programming algorithms to optimize the function F(N). For larger clusters (e.g., more than ten nodes), the system can determine a greedy normalized candidate assignment for each node, for example, by selecting the best matching candidate for each node. The best matching candidate can be, for example, the candidate with the highest $Score_{k+1}$ value for the node, e.g., calculated according to the $Score_{k+1}$ formula described below after a given number of iterations. The system then optimizes the clusters by taking various actions. These actions include, but are not limited to, moving a node between sub-clusters (e.g., nodes that share the same normalization rule) by changing the normalized form of the node, exchanging the normalized form of two nodes, moving all nodes in one sub-cluster to another sub-cluster, and exchanging the normalized form of two sub-clusters. The system only takes a given action if the action will improve the value for F(N); in other words, the system takes these actions to move toward a local optimum.

The first term in the function F(N) corresponds to an overall matching score between the words in the cluster and their normalized form. This term is calculated according to the following formula:

$$FinalScore(W,N) = \max_L \{weight(L, |W|) \times suffixScore(suffix(W,L), W \rightarrow N)\}$$

where |W| is the number of characters in W, L is a number of last letters of the word W, N is the candidate normalized form, $W \rightarrow N$ is the suffix-replacement rule that maps word W to its normalized form N by replacing the last L letters of W, weight(L, |W|) is a weighting function that has a higher weight when the length of the suffix is large compared to the length of W, for example:

$$weight(L, |W|) = -4 \times \left(\frac{L}{|W|} - 0.5\right)^2 \text{ when } L > \frac{|W|}{2}, \text{ and}$$

0 otherwise.

suffixScore is calculated according to the following formula:

$$suffixScore(S,R) = Avg_{W_j has\ suffix\ S}\{Score(W_j, R(W_j))\},$$

where $R(W_i)$ is the result of rule R applied to the word $W_i$ (e.g., the normalized form of the word $W_i$), and the score is iteratively computed using:

$$Score_{k+1}(W, N) = \frac{\sum_{W_i}(edge(W, W_i) \times Score_k(W_i, N))}{\sum_{W_i} edge(W, W_i)},$$

where $edge(W, W_i)$ is the weight of the edge between words W and $W_i$ in the graph G, and $Score_0$ is calculated according to the equation above. In some implementations, the system iterates a fixed number of times to determine the Score. In some implementations, the number of times can be a pre-determined number of iterations; in other implementations, the number of times is separately determined for each cluster according to the diameter of the clusters, i.e., the maximum edge weights between terms in the cluster. For example, the system can select a number of times that is equal to the diameter of the cluster so that every initial candidate for a node in the cluster will be considered when calculating the score for all other nodes in the cluster.

In alternative implementations, the system iterates until the change in the score is less than a threshold. The threshold can be determined, for example, empirically.

The second term in the function F(N) penalizes putting two words that are connected by an edge whose weight exceeds a threshold into different clusters. $Edge(W_i, W_j)|N_i \neq N_j$ is the weight of the edges from $W_i$ to an adjacent node $W_j$ that has a different normalized form than $W_i$.

The third term in the function F(N) penalizes putting two words that are not connected by an edge in the same cluster. $NoEdge(W_i, W_j)|N_i = N_j$ is 1 if $W_j$ was not a variant for $W_i$ in any of the variant pairs, but $W_i$ and $W_j$ have the same normalized form, is more than 1 if $W_j$ was a variant for $W_i$ with a score below a threshold (e.g., below 0) and $W_i$ and $W_j$ have the same normalized form, and otherwise is 0.

Figure 5A:
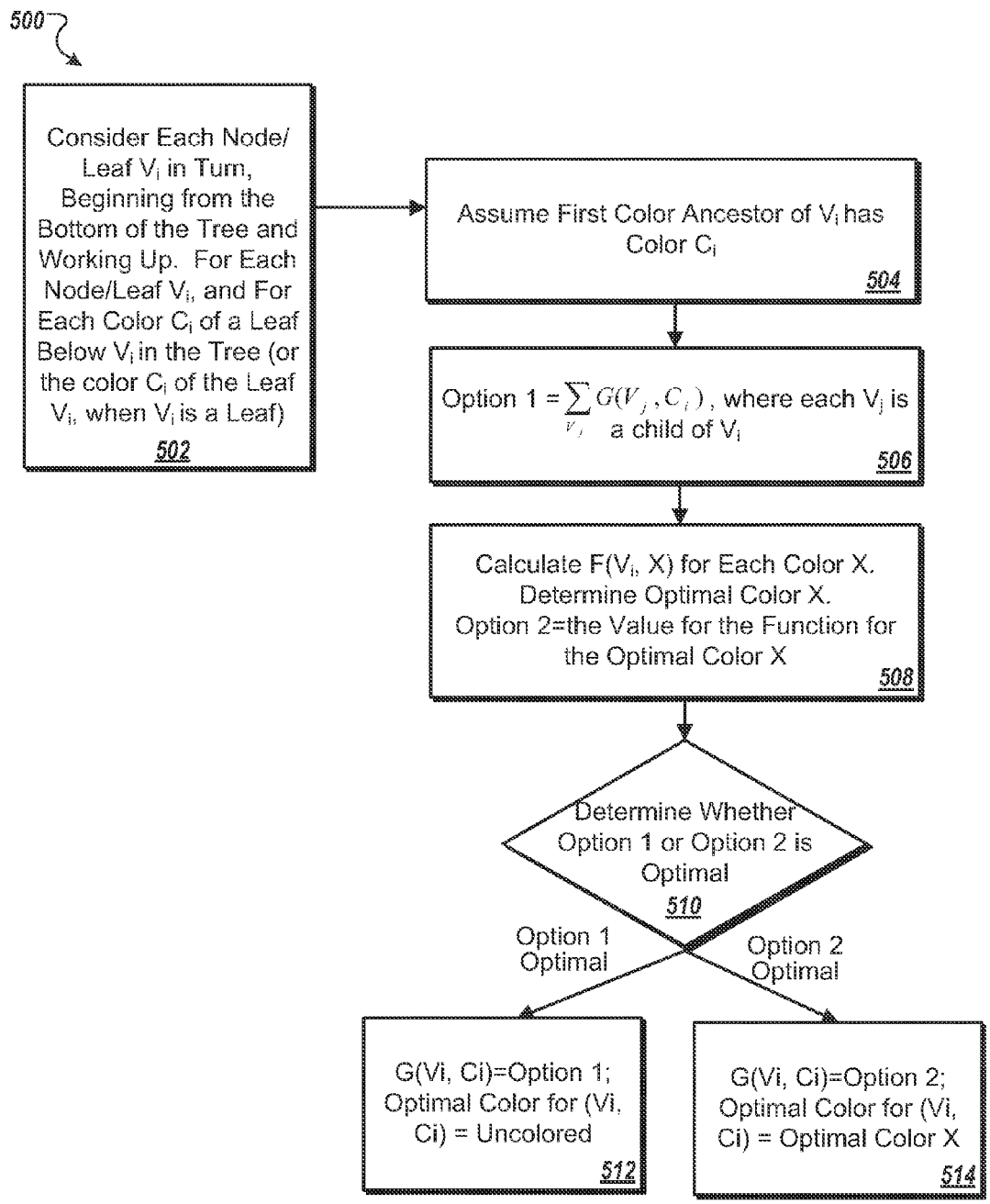
FIGS. 5A and 5B illustrate an example method for determining the optimal canonical suffix-rewriting rule for one or more nodes in a tree.
Figure 5B:
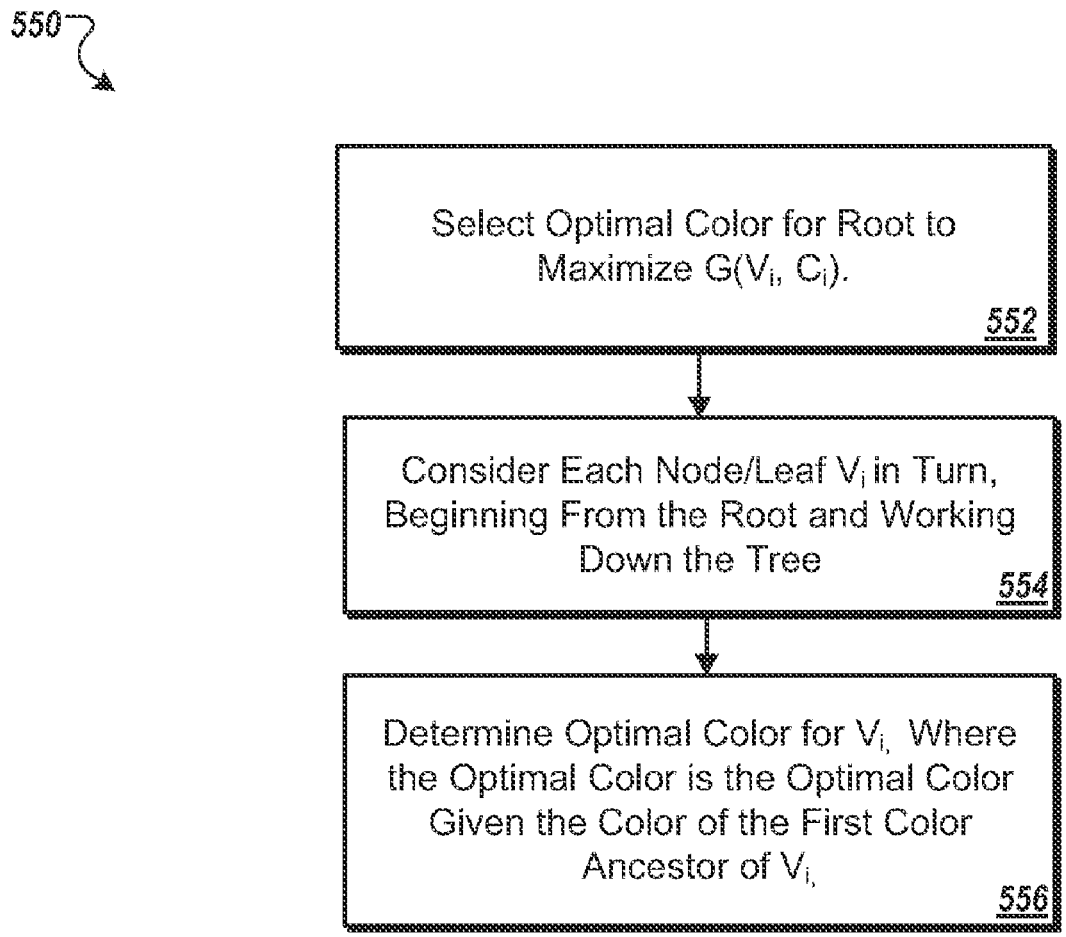

FIGS. 5A and 5B illustrate an example method for determining the optimal canonical suffix-rewriting rule for one or more nodes in a tree. First, as illustrated in FIG. 5A, the method traverses the suffix tree from leaves to root and determines conditional optimal suffix-rewriting rules for each node of the tree. The optimal rules are conditioned on the color of a node above the node in the tree. Then, as illustrated in FIG. 5B, the method traverses the suffix tree from root to leaves and selects the optimal color for one or more of the nodes in the tree, given the optimal color of the first colored node above the node in the tree.

For illustrative purposes, the description herein refers to "colors." Each color represents a different canonical suffix rewriting rule. A node or a leaf has a color when it is associated with the canonical suffix rewriting rule associated with that color. However, other representations of the canonical suffix rewriting rule, besides colors, can alternatively be used.

FIG. 5A illustrates an example method 500 for determining the conditional optimal suffix-rewriting rules for each node of the suffix tree. For convenience, the method 500 will be described with reference to a system that performs the method.

The system considers each node and leaf $V_i$ in turn, working from the leaves of the tree to the root of the tree (502). For each node or leaf $V_i$ the system determines a conditional optimal suffix-rewriting rule under different conditions. Each condition corresponds to a different possible color $C_i$ for the first color ancestor of the node $V_i$. The possible colors $C_i$ are the colors of the leaves underneath $V_i$ in the suffix tree when $V_i$ is a node, or the color of $V_i$ when $V_i$ is a leaf. The system also determines a score for $G(V_i, C_i)$ for the node and the color. This score is used to determine the optimal conditional colors for nodes above $V_i$ in the tree, and is also used to pick the optimal color for the root of the tree, as described below.

For each node $V_i$, and for each color C, the system assumes the first color ancestor of Vi has the color $C_i$ (504), and determines whether in that case, the optimal color of $V_i$ is uncolored, or a specific color. The color is selected to induce the correct color for the leaves for the node $V_i$.

The system does this by determining what color for $V_i$ will lead to an optimal value for a scoring function $F(V_i, C)$. The function F can include two parts. One part measures the size resulting from applying the color C to the node $V_i$, and the other part measures the flow resulting from applying the color C to the node $V_i$. The size is the number of nodes and leaves beneath $V_i$ in the tree that do not have the color C and can be determined, for example, by summing the size for the child nodes and leaves directly below $V_i$ in the tree. The flow is the number of leaves below $V_i$ in the suffix-tree that are associated with the canonical suffix-rewriting rule corresponding to the color C and can be determined, for example, by summing the flow for the child nodes and leaves directly below $V_i$ in the tree. When $V_i$ is a leaf, the size is 0 and the flow is 1 when the leaf is associated with the canonical suffix-rewriting rule corresponding to the color C, and the size is 1 and the flow is 0 when the leaf is not associated with the canonical suffix-rewriting rule corresponding to the color C.

In general, the system wants to minimize the size while maximizing the flow. For example, in some implementations, the function F is a linear combination of size and flow, e.g.:

$$F(V_i, C) = size(V_i, C) - A \times flow(V_i, C),$$

where A is a constant determined, for example, empirically. Because size and flow are derived from the children leaves and nodes directly below $V_i$ in the tree, $F(V_i, C)$ can alternatively be expressed as follows:

$$F(V_i, C) = \left(\sum_{V_j} size(V_j, C)\right) - A \times \left(\sum_{V_j} flow(V_j, C)\right),$$

where each $V_j$ is a child node or leaf directly below $V_i$ in the tree.

To optimize this function, the system will want to find the minimal value for F. However, other constructions of the function could lead to different optimizations; for example, if the function F only considers the flow for a given node and color, the optimal value for the function F is a maximum value.

To determine the optimal color for the node $V_i$, the system calculates two options: option 1 corresponds to the case where node $V_i$ is uncolored (and therefore gets its color from its first color ancestor), and option 2 corresponds to the case where node $V_i$ is colored a specific (optimal) color.

When $V_i$ is uncolored, it gets its color from its first color ancestor. Therefore, the flow when $V_i$ is uncolored is the sum of the flow for the nodes below $V_i$ in the tree for the color $C_i$ of the first color ancestor. The system calculates option 1 (506) as follows:

$$option\ 1 = \sum_{V_j} G(V_j, C_i),$$

where each $V_j$ is a child node or a child leaf of the node $V_i$; $G(V_j, C_i)$ for leaves is the value of $F(V_j, C_i)$ for the leaf (determined from whether the canonical suffix-rewriting rule corresponding to the leaf has the color $C_i$); and $G(V_j, C_i)$ for nodes was previously determined for each node below Vi in the tree.

When $V_i$ is assigned a color, the value of the function F is the sum of the function for the nodes and leaves below $V_i$ in the tree for the color that is assigned to the node. Therefore, the system first determines which X will have the optimal value for the function F. The system does this by calculating $F(V_j, X)$ for each possible color X, for example, using the formula given above for option 1. The system considers each color X corresponding to a color of one of node Vi's leaf nodes, except for color $C_i$. The system selects the color X that results in the optimal value for the function F.

The system then assigns option 2 the value of the function $F(V_j X)$ for the optimal X.

The system then determines whether option 1 or option 2 is optimal (510). If option 1 is optimal (512), then the system determines that the optimal coloring for node $V_i$ given a first color ancestor with the color $C_i$ is uncolored (e.g., no associated canonical suffix-rewriting rule), and sets $G(V_i, C_i)$=option 1. Otherwise (514), the system determines that the optimal coloring for the node $V_i$ given a first color ancestor with the color C is the optimal color X. The system sets $G(V_i, C_i)$=option 2.

In some implementations, the system only computes conditional coloring data when the node satisfies one or more conditions. For example, the system may only compute conditional coloring for nodes that are within a threshold number of nodes away from a leaf in the suffix tree. The threshold can be determined, for example, empirically. As another example, the system may only compute conditional coloring for a given node and a given color when the suffix of the given node includes the initial suffix of the suffix-rewriting rule of the given color. For example, if the rule is, {"... ies"→"... ied"}, and a node corresponds to the suffix "ing," then the system does not compute a conditional optimal color for the node.

FIG. 5B illustrates an example method 550 for determining the optimal suffix-rewriting rules for one or more nodes in a suffix tree. The method traverses the tree from the root to the leaves, and assigns colors (e.g., canonical suffix-rewriting rules) to one or more nodes in the tree. The colors that are assigned correspond to the conditional colors determined, for example, using the method 500. For convenience, the method 550 will be described with reference to a system that performs the method.

The system selects an optimal color for the root of the tree (552). The optimal color is selected to maximize $G(V_i, C_i)$. The system then considers each node/leaf $V_i$ of the tree in turn (554), beginning from the root and working down the tree. For each node/leaf $V_i$, the system determines the optimal color for $V_i$ (556). Because the system works from root to leaves, the system has already determined the optimal color for the first color ancestor for $V_i$. Therefore, the optimal color for $V_i$ is the conditional optimal color for node/leaf $V_i$ when the first color ancestor for $V_i$ has its optimal color.

FIG. 6A illustrates an example suffix-tree 600 for the canonical suffix-rewriting rule {"... ing"→"ed"}. The suffix-tree 600 is structured much as the suffix-trees described above. Leaves of the tree 600 (e.g., 602, 604, 606, 608, 610, 612, and 614) correspond to words, and nodes of the tree (e.g., 616, 618, 620, and 622) correspond to common suffixes.

Each leaf of the suffix tree 600 corresponds to a word associated with the canonical suffix-rewriting rule. Some of the leaves are valid (@yes) and some of the leaves are invalid (@no). Valid leaves are leaves that correspond to words that are associated with the suffix rule as valid words, and invalid leaves are leaves that correspond to words that are associated with the suffix as invalid words. A word is valid when, when the canonical suffix-rewriting rule is applied to the word, a valid variant of the word results. A word is invalid when, when the canonical suffix rewriting rule is applied to the word, an invalid variant of the word results. Valid variants are real words, while invalid variants are words that are not real words.

FIG. 6B illustrates the example suffix tree 600 once a minimum colored subset of the nodes and leaves has been selected, and optimal statuses (e.g., valid or invalid) have been assigned to the nodes and leaves in the minimum colored subset. Selecting a minimum colored subset is described in more detail below with reference to FIGS. 7 and 8. Nodes that are valid are colored with the color @yes, and nodes that are invalid are colored with the color @no.

Suffix-rewriting rules are generated from the nodes of the tree. For example, in some implementations, a suffix-rewriting rule is generated for each of the valid nodes in the tree. The rule maps the suffix of the valid node to the suffix with the suffix replacement corresponding to the canonical suffix-rewriting rule for the tree. For example, the tree in FIG. 6B corresponds to the canonical suffix-rewriting rule {"... ing"→"... ed"}. Node 620 corresponds to the suffix "... threading." Therefore, a suffix-rewriting rule is generated that maps "... threading" to "... threaded." In some implementations, each suffix-rewriting rule generated from a valid node is associated with a confidence measure. In some implementations, the confidence measure is derived from the average confidence measure of the leaves below the tree that correspond to valid words for the rule.

In some implementations, suffix-rewriting rules are also generated from the invalid nodes in the tree in the same way that the suffix-rewriting rules are generated from the valid nodes in the tree. Suffix-rewriting rules generated from invalid nodes are given a low confidence measure to indicate that they should not be applied to words. For example, these suffix-rewriting rules can be given a confidence measure below a threshold to indicate that the rules are invalid rules. The threshold can be, for example, zero.

Figure 7:
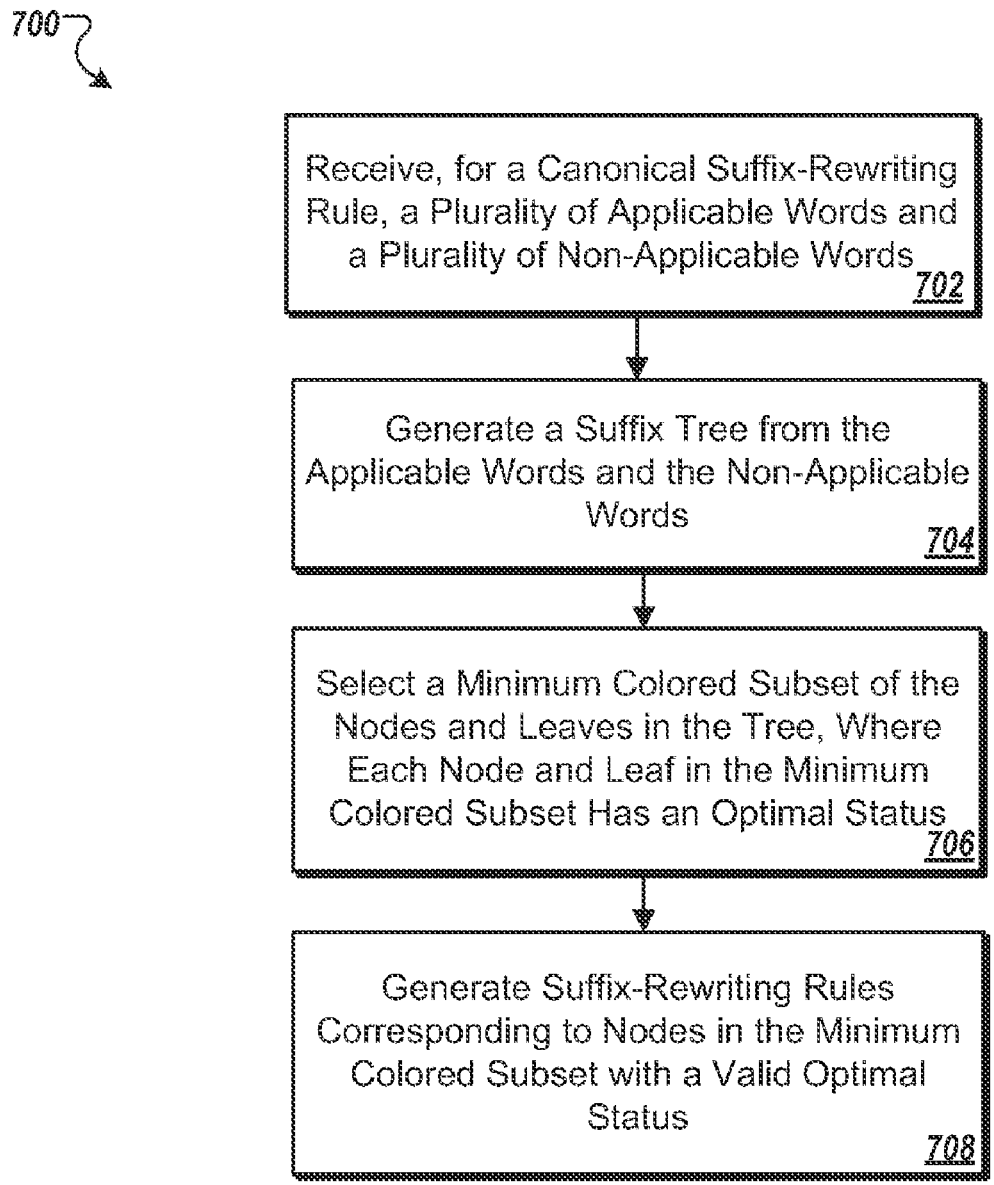
FIG. 7 illustrates an example method for generating suffix-rewriting rules from a suffix tree for a particular canonical suffix-rewriting rule.

FIG. 7 an example method 700 for generating suffix-rewriting rules from a suffix tree for a particular canonical suffix-rewriting rule. For convenience, the method will be described in reference to a system that performs the method. The system can be, for example, one or more computers.

The system receives, for a canonical suffix-rewriting rule, a plurality of applicable words and a plurality of non-applicable words (702). The applicable words are words to which the rule should be applied, and the non-applicable words are words to which the rule should not be applied.

The system generates a suffix tree from the applicable words and the non-applicable words (704). The suffix tree has both nodes and leaves. The nodes and leaves are arranged in a hierarchical structure wherein each node has one or more children nodes or one or more leaf nodes below the node in the tree, each leaf corresponds to one of the applicable words or one of the non-applicable words. An example suffix tree is described above with reference to FIG. 6A.

The system selects a minimum colored subset of the nodes and leaves in the tree (706). Each node and leaf in the minimum colored subset has an optimal status. In some implementations, the system selects the minimum colored subset by coloring the suffix-tree using the techniques described above with reference to FIGS. 5A and 5B. The system only uses two colors, in contrast to the technique described above with reference to FIGS. 5A and 5B. Each color represents a status of the node. The status is either valid or invalid. In some implementations, the system uses a different function F when coloring the tree. For example, the function can use the system can calculate F according to the function:

$$F(V_i, C) = \left(\sum_{V_j} \text{size}(V_j, C)\right) - A \times \left(\sum_{V_j} \text{flow}(V_j, C)^2\right),$$

where A is a constant determined, for example, empirically, and each $V_j$ is a node or leaf directly below $V_i$ in the tree.

In other implementations, the system then applies the algorithm described above with reference to FIGS. 5A and 5B with the valid and invalid colors described above, and with a small modification. Some of the leaves of the suffix-tree generated by the system are uncolored. For example, uncolored leaves can be leaves who correspond to a word whose confidence measure for the rule is higher than the first threshold but lower than the second threshold. Uncolored leaves can be given an arbitrary color (valid or invalid) by the coloring algorithm.

In still other implementations, the system colors the suffix-tree, but does so using different conditions than the ones described above with reference to FIGS. 5A and 5B. This alternative tree-coloring algorithm is described in more detail below with reference to FIGS. 8A and 8B.

The system generates suffix-rewriting rules corresponding to nodes in the minimum colored subset with a valid optimal status (708), for example, as described above with reference to FIG. 6B.

Figure 8A:
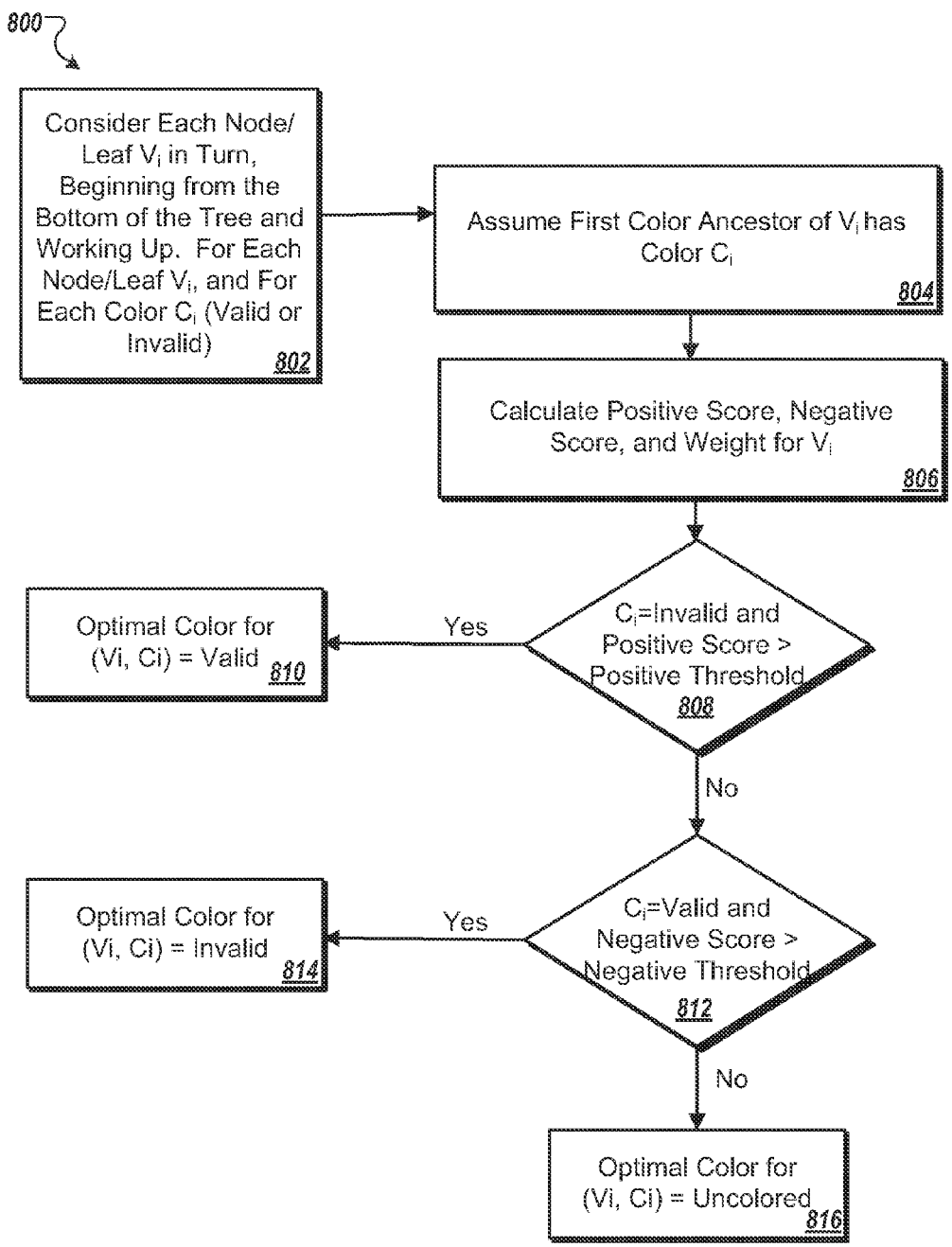
FIGS. 8A and 8B illustrate an example method for coloring the nodes of a tree as either valid or invalid nodes.
Figure 8B:
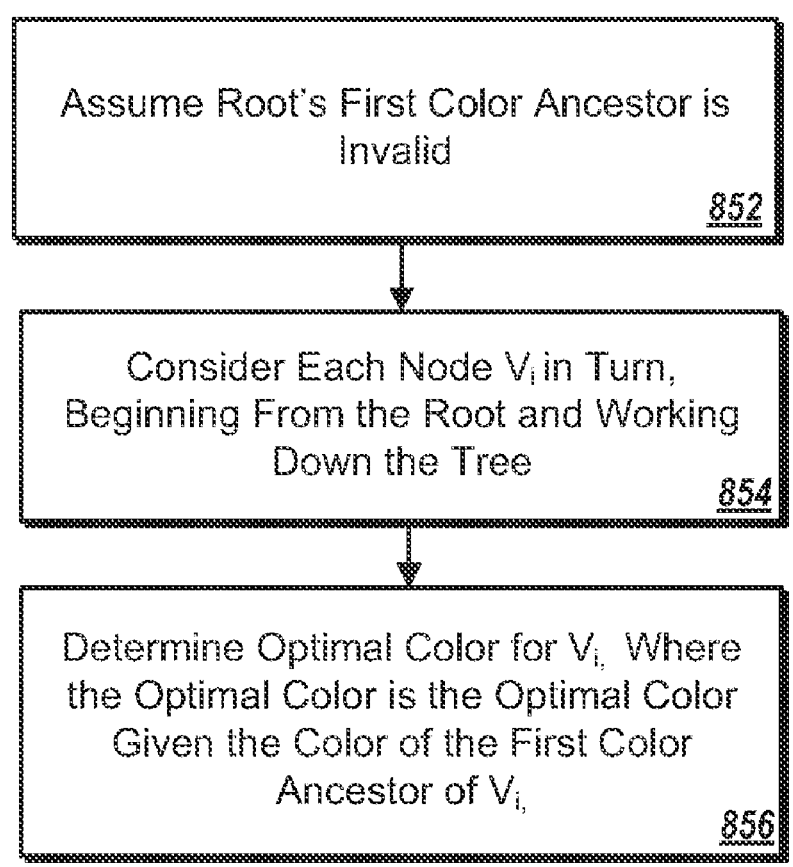

FIGS. 8A and 8B illustrate an example method for coloring the nodes of a tree as either valid or invalid nodes. First, as illustrated in FIG. 8A, the method traverses the suffix tree from leaves to root and determines conditional optimal colors for each node of the tree. The optimal rules are conditioned on the color of a node above the node in the tree. Then, as illustrated in FIG. 8B, the method traverses the suffix tree from root to leaves and selects the optimal color for one or more of the nodes in the tree, given the optimal color of the first colored node above the node in the tree.

FIG. 8A illustrates an example method 800 for determining the conditional optimal colors for each node of the suffix tree. For convenience, the method 800 will be described with reference to a system that performs the method.

The system considers each node and leaf $V_i$ of the suffix tree in turn, beginning from the bottom of the tree and working up (802). A conditional color is determined under the condition that the node or leaf has a first color ancestor that is valid and the condition that the node or leaf has a first color ancestor that is invalid. For each node or leaf $V_i$, and each color $C_i$ (valid or invalid), the system performs the following steps.

First, the system assumes that the first color ancestor of $V_i$ has the color $C_i$ (804). The system then calculates a positive score, a negative score, and a weight for $V_i$ (806). The positive score is derived from the number of valid nodes below the children of $V_i$ in the tree, and the negative score is derived from the number of invalid nodes below the children of $V_i$ in the tree. The weight is derived from the weights of the children nodes of $V_i$.

In some implementations, each valid leaf is assigned a positive score equal to the confidence measure for the leaf, a negative score of zero, and a weight of one, and each invalid leaf is assigned a positive score of zero, a negative score of one, and a weight of one. Other default values can also be used.

The positive score is calculated according to the following formula:

$$\text{positive score } (V_i) = \frac{\sum_j w_j}{\sum_j \frac{w_j}{p_j + \alpha}} - \alpha,$$

where $\alpha$ is a smoothing parameter chosen, for example, empirically, $w_j$ is the weight of the jth direct child of the node $V_i$, and $p_j$ is the positive score of the jth direct child of node $V_i$. Because the system works from the leaves to the root, the weight of the jth child of node $V_i$ and the positive score of the jth child of $V_i$ have already been calculated by the time the system calculates the positive score for $V_i$.

The negative score is calculated according to the following formula:

$$\text{negative score } (V_i) = \beta - \frac{\sum_j w_j}{\sum_j \frac{w_j}{\beta - q_i}},$$

where $w_j$ is a smoothing parameter chosen, for example, empirically, $w_j$ is the weight of the jth direct child of node $V_i$, and $q_i$ is the negative score of the jth direct child of node $V_i$.

The weight is calculated according to the following formula:

$$w_i = \ln\left(\sum_j e^{w_j}\right),$$

where $w_j$ is the weight of the jth direct child of node $V_i$.

The system then determines the appropriate conditional color for the node $V_i$ according to the positive score and the negative score. If the color of the first ancestor for $V_i$ is invalid, and the positive score exceeds a positive threshold (808), the optimal conditional color for $V_i$ is valid, given a first color ancestor having a color of invalid (810). The positive threshold can be determined, for example, empirically. Otherwise, if the color of the first color ancestor for $V_i$ is valid and the negative score exceeds a negative threshold (812), then the optimal conditional color for $V_i$ is invalid, given a first color ancestor having a color of valid (814). Otherwise, the optimal conditional color for $V_i$ given a first color ancestor having a color of $C_i$ is uncolored (816).

FIG. 8B illustrates an example method 850 for determining the optimal suffix-rewriting rules for one or more nodes in a suffix tree. The method traverses the tree from the root to the leaves, and assigns colors (e.g., valid or invalid) to one or more nodes or leaves in the tree. Nodes that are assigned a color of valid or invalid are part of the minimum colored subset. The colors that are assigned correspond to the conditional colors determined, for example, using the method 800. For convenience, the method 850 will be described with reference to a system that performs the method.

The system assumes that the first color ancestor of the root of the suffix tree has a color of invalid (852). The system then considers each node $V_i$ in turn, beginning from the root and working down the tree (854). The system determines the optimal color for each node $V_i$ (856). The optimal color is the conditional optimal color for the node, given the color of the first color ancestor of $V_i$ (856). This can be valid, invalid, or uncolored.

Figure 9:
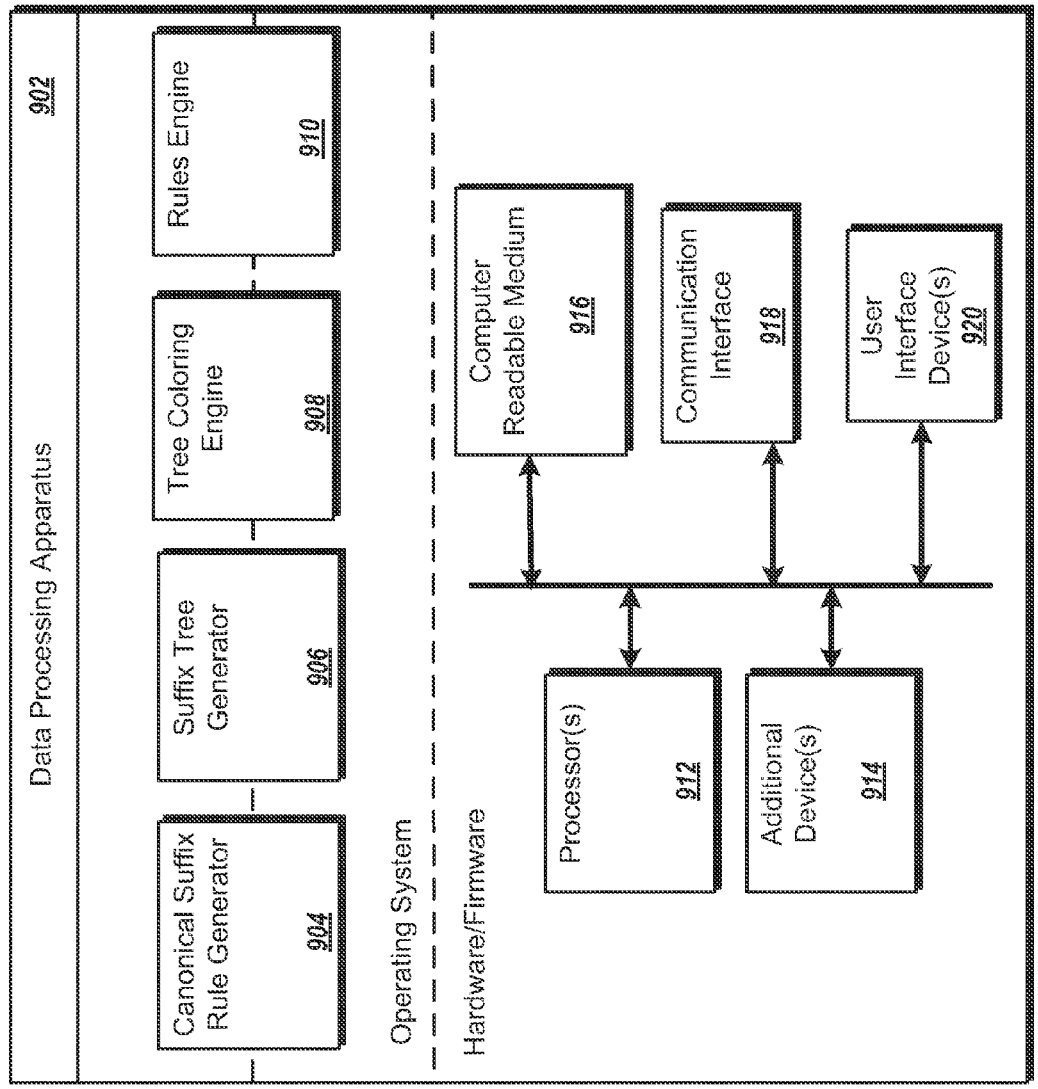
FIG. 9 illustrates an example architecture of a system.

FIG. 9 illustrates an example architecture of a system 900. The system consists of one or more data processing apparatus 902. While only one data processing apparatus 902 is shown in FIG. 9, multiple data processing apparatus can be used. The data processing apparatus include various modules, e.g. executable software programs, including a canonical suffix rule generator 904, suffix tree generator 906, rule engine 908, tree coloring engine 910. Each module runs as part of the operating system on the data processing apparatus, runs as an application on the data processing apparatus, or runs as part of the operating system and part of an application on the data processing apparatus.

The canonical suffix rule generator 904 identifies canonical suffix rules from word-variant pairs, for example, as described above with reference to FIG. 4A. In some implementations, the canonical suffix rule generator 904 can also include a normalized form generator (not shown) that generates normalized forms of words, for example, as described above with reference to FIG. 4B.

The suffix tree generator 906 generates suffix trees from word-variant pairs, and the tree coloring engine 908 determines which nodes are valid, or which canonical suffix rules to associate with each tree, for example, as described above with reference to FIGS. 3, 5A-5B, 6A-6B, 7, and 8A-8B.

The rules engine 910 generates rules from the suffix-tree, for example, as described above with reference to FIGS. 2C and 6B.

The data processing apparatus 902 can also have hardware or firmware devices including one or more processors 912, one or more additional devices 914, a computer readable medium 916, a communication interface 918, and one or more user interface devices 920. Each processor 912 is capable of processing instructions for execution within the server 902. In some implementations, the processor 912 is a single-threaded processor. In other implementations, the processor 912 is a multi-threaded processor. Each processor 912 is capable of processing instructions stored on the computer readable medium 916 or on a storage device (e.g., an additional device 914). The data processing apparatus 902 uses its communication interface 918 to communicate with one or more computers, for example, over a network. Examples of user interface devices 920 include a display, a camera, a speaker, a microphone, a tactile feedback device, a keyboard, and a mouse.

The data processing apparatus 902 can store instructions that implement operations associated with the modules described above, for example, on the computer readable medium 916 or one or more additional devices 914, for example, one or more of a floppy disk device, a hard disk device, an optical disk device, or a tape device. In some implementations, the data processing apparatus 902 also stores additional data, for example, user preference data, parent-query associations, candidate siblings, final siblings, or other data, on the computer readable medium 916 or one or more additional devices 914.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    obtaining a plurality of canonical suffix-rewriting rules, each rule associated with one or more words to which the rule applies, wherein each canonical suffix-rewriting rule specifies a suffix replacement;
    generating a suffix tree from the words associated with the canonical suffix-rewriting rules, the suffix tree comprising a plurality of nodes and a plurality of leaves arranged in a hierarchical structure, wherein each node has one or more children below the node in the tree and each child is either a node or a leaf, and wherein each leaf corresponds to a distinct one of the words associated with the canonical suffix-rewriting rules and each node corresponds to a suffix of its children in the tree;
    selecting, using one or more processors a minimum colored subset of the nodes and leaves in the suffix tree, wherein each node and leaf in the minimum colored subset is associated with a respective optimal canonical suffix-rewriting rule, wherein the minimum colored subset and optimal canonical suffix-rewriting rules are selected such that a derived canonical suffix-rewriting rule for each leaf matches the canonical suffix-rewriting rule associated with the word corresponding to the leaf, wherein the derived canonical suffix-rewriting rule for each leaf is the optimal canonical suffix-rewriting rule for a first colored ancestor of the leaf in the tree, and wherein the first colored ancestor for a leaf is the leaf, if the leaf is included in the minimum colored subset, and otherwise is a first node above the leaf in the tree that is in the minimum colored subset; and
    generating a plurality of final suffix-rewriting rules, each rule mapping a suffix of a node in the minimum colored subset to the suffix of the node with the suffix replacement specified by the canonical rule for the node.

2. The method of claim 1, wherein obtaining the plurality of canonical suffix-rewriting rules comprises:
    obtaining a first plurality of word-variant pairs, each pair comprising a word and a variant for the word; and
    associating a canonical suffix-rewriting rule with each of the word-variant pairs, including removing a longest common prefix from the word and the variant, and then generating the canonical suffix-rewriting rule from a remaining suffix of the word and a remaining suffix of the variant.

3. The method of claim 2, wherein the variant for each word is a normalized form of the word, and wherein obtaining the first plurality of word-variant pairs comprises:

obtaining a second plurality of word-variant pairs, each second pair comprising a word and a variant for the word, each second pair associated with a confidence measure;

clustering the words in the second plurality of word-variant pairs according to relationships between words and variants in the word-variant pairs;

determining an optimal normalized form for each word in the second plurality of word pairs, the determining including selecting an optimal normalized form for each cluster; and generating the first plurality of word-variant pairs, each pair associating a word from one of the second word-variant pairs with the optimal normalized form for the cluster for the word.

4. The method of claim 1, wherein selecting the minimum colored subset of the nodes and leaves in the suffix tree comprises determining optimal conditional rules for each node and leaf in the suffix tree, and then selecting the minimum colored subset and the optimal canonical suffix-rewriting rule for each node and leaf in the subset according to the optimal conditional rules.

5. The method of claim 4, wherein:
the optimal conditional rule for a node or leaf is the rule that is optimal for the condition that a parent node of the node or leaf is associated with a particular canonical suffix-rewriting rule; and selecting an optimal canonical suffix-rewriting rule for each node according to the optimal conditional rules for the node comprises:
determining an optimal canonical suffix-rewriting rule for a root of the suffix tree; and
determining an optimal canonical suffix-rewriting rule for each remaining node in the tree, wherein the optimal canonical suffix-rewriting rule for a node in the tree is the optimal conditional rule for the canonical suffix-rewriting rule associated with a parent of the node.

6. The method of claim 1, further comprising generating a normalized form of a word using one of the plurality of final suffix-rewriting rules.

7. The method of claim 1, further comprising generating a variant for a word using one of the plurality of final suffix-rewriting rules.

8. A computer readable storage medium encoded with a computer program, the computer program comprising computer instructions that, when executed by one or more data processing apparatus, cause the data processing apparatus to perform operations comprising:

obtaining a plurality of canonical suffix-rewriting rules, each rule associated with one or more words to which the rule applies, wherein each canonical suffix-rewriting rule specifies a suffix replacement;

generating a suffix tree from the words associated with the canonical suffix-rewriting rules, the suffix tree comprising a plurality of nodes and a plurality of leaves arranged in a hierarchical structure, wherein each node has one or more children below the node in the tree and each child is either a node or a leaf, and wherein each leaf corresponds to a distinct one of the words associated with the canonical suffix-rewriting rules and each node corresponds to a suffix of its children in the tree;

selecting a minimum colored subset of the nodes and leaves in the suffix tree, wherein each node and leaf in the minimum colored subset is associated with a respective optimal canonical suffix-rewriting rule, wherein the minimum colored subset and optimal canonical suffix-rewriting rules are selected such that a derived canonical suffix-rewriting rule for each leaf matches the canonical suffix-rewriting rule associated with the word corresponding to the leaf, wherein the derived canonical suffix-rewriting rule for each leaf is the optimal canonical suffix-rewriting rule for a first colored ancestor of the leaf in the tree, and wherein the first colored ancestor for a leaf is the leaf, if the leaf is included in the minimum colored subset, and otherwise is a first node above the leaf in the tree that is in the minimum colored subset; and generating a plurality of final suffix-rewriting rules, each rule mapping a suffix of a node in the minimum colored subset to the suffix of the node with the suffix replacement specified by the canonical rule for the node.

9. The computer storage medium of claim 8, wherein obtaining the plurality of canonical suffix-rewriting rules comprises:

obtaining a first plurality of word-variant pairs, each pair comprising a word and a variant for the word; and associating a canonical suffix-rewriting rule with each of the word-variant pairs, including removing a longest common prefix from the word and the variant, and then generating the canonical suffix-rewriting rule from a remaining suffix of the word and a remaining suffix of the variant.

10. The computer storage medium of claim 9, wherein the variant for each word is a normalized form of the word, and wherein obtaining the first plurality of word-variant pairs comprises:

obtaining a second plurality of word-variant pairs, each second pair comprising a word and a variant for the word, each second pair associated with a confidence measure;

clustering the words in the second plurality of word-variant pairs according to relationships between words and variants in the word-variant pairs;

determining an optimal normalized form for each word in the second plurality of word pairs, the determining including selecting an optimal normalized form for each cluster; and generating the first plurality of word-variant pairs, each pair associating a word from one of the second word-variant pairs with the optimal normalized form for the cluster for the word.

11. The computer storage medium of claim 8, wherein selecting the minimum colored subset of the nodes and leaves in the suffix tree comprises determining optimal conditional rules for each node and leaf in the suffix tree, and then selecting the minimum colored subset and the optimal canonical suffix-rewriting rule for each node and leaf in the subset according to the optimal conditional rules.

12. The computer storage medium of claim 11, wherein:
the optimal conditional rule for a node or leaf is the rule that is optimal for the condition that a parent node of the node or leaf is associated with a particular canonical suffix-rewriting rule; and selecting an optimal canonical suffix-rewriting rule for each node according to the optimal conditional rules for the node comprises:
determining an optimal canonical suffix-rewriting rule for a root of the suffix tree; and
determining an optimal canonical suffix-rewriting rule for each remaining node in the tree, wherein the optimal canonical suffix-rewriting rule for a node in the tree is the optimal conditional rule for the canonical suffix-rewriting rule associated with a parent of the node.

13. The computer storage medium of claim 12, further operable to cause data processing apparatus to perform operations comprising generating a normalized form of a word using one of the plurality of final suffix-rewriting rules.

14. The computer storage medium of claim 13, further operable to cause data processing apparatus to perform operations comprising generating a variant for a word using one of the plurality of final suffix-rewriting rules.

15. A system, comprising:
a processor; and
a computer-readable storage device storing instructions that, when executed by the processor, cause the processor to perform operations comprising:
obtaining a plurality of canonical suffix-rewriting rules, each rule associated with one or more words to which the rule applies, wherein each canonical suffix-rewriting rule specifies a suffix replacement;
generating a suffix tree from the words associated with the canonical suffix-rewriting rules, the suffix tree comprising a plurality of nodes and a plurality of leaves arranged in a hierarchical structure, wherein each node has one or more children below the node in the tree and each child is either a node or a leaf, and wherein each leaf corresponds to a distinct one of the words associated with the canonical suffix-rewriting rules and each node corresponds to a suffix of its children in the tree;
selecting a minimum colored subset of the nodes and leaves in the suffix tree, wherein each node and leaf in the minimum colored subset is associated with a respective optimal canonical suffix-rewriting rule, wherein the minimum colored subset and optimal canonical suffix-rewriting rules are selected such that a derived canonical suffix-rewriting rule for each leaf matches the canonical suffix-rewriting rule associated with the word corresponding to the leaf, wherein the derived canonical suffix-rewriting rule for each leaf is the optimal canonical suffix-rewriting rule for a first colored ancestor of the leaf in the tree, and wherein the first colored ancestor for a leaf is the leaf, if the leaf is included in the minimum colored subset, and otherwise is a first node above the leaf in the tree that is in the minimum colored subset; and
generating a plurality of final suffix-rewriting rules, each rule mapping a suffix of a node in the minimum colored subset to the suffix of the node with the suffix replacement specified by the canonical rule for the node.

16. The system of claim 15, wherein obtaining the plurality of canonical suffix-rewriting rules comprises:
obtaining a first plurality of word-variant pairs, each pair comprising a word and a variant for the word; and
associating a canonical suffix-rewriting rule with each of the word-variant pairs, including removing a longest common prefix from the word and the variant, and then generating the canonical suffix-rewriting rule from a remaining suffix of the word and a remaining suffix of the variant.

17. The system of claim 16, wherein the variant for each word is a normalized form of the word, and wherein obtaining the first plurality of word-variant pairs comprises:
obtaining a second plurality of word-variant pairs, each second pair comprising a word and a variant for the word, each second pair associated with a confidence measure;
clustering the words in the second plurality of word-variant pairs according to relationships between words and variants in the word-variant pairs;
determining an optimal normalized form for each word in the second plurality of word pairs, the determining including selecting an optimal normalized form for each cluster; and
generating the first plurality of word-variant pairs, each pair associating a word from one of the second word-variant pairs with the optimal normalized form for the cluster for the word.

18. The system of claim 15, wherein selecting the minimum colored subset of the nodes and leaves in the suffix tree comprises determining optimal conditional rules for each node and leaf in the suffix tree, and then selecting the minimum colored subset and the optimal canonical suffix-rewriting rule for each node and leaf in the subset according to the optimal conditional rules.

19. The system of claim 18, wherein:
the optimal conditional rule for a node or leaf is the rule that is optimal for the condition that a parent node of the node or leaf is associated with a particular canonical suffix-rewriting rule; and
selecting an optimal canonical suffix-rewriting rule for each node according to the optimal conditional rules for the node comprises:
determining an optimal canonical suffix-rewriting rule for a root of the suffix tree; and
determining an optimal canonical suffix-rewriting rule for each remaining node in the tree, wherein the optimal canonical suffix-rewriting rule for a node in the tree is the optimal conditional rule for the canonical suffix-rewriting rule associated with a parent of the node.

20. The system of claim 15, further operable to perform operations comprising generating a normalized form of a word using one of the plurality of final suffix-rewriting rules.

21. The system of claim 15, further operable to perform operations comprising generating a variant for a word using one of the plurality of final suffix-rewriting rules.

* * * * *